(12) United States Patent
Nagao et al.

(10) Patent No.: US 11,767,659 B2
(45) Date of Patent: Sep. 26, 2023

(54) HYDRAULIC SYSTEM FOR WORKING MACHINE, AND WORKING MACHINE

(71) Applicant: KUBOTA CORPORATION, Osaka (JP)

(72) Inventors: Kohei Nagao, Sakai (JP); Yuji Fukuda, Sakai (JP); Ryota Hamamoto, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/840,679

(22) Filed: Jun. 15, 2022

(65) Prior Publication Data

US 2023/0051323 A1 Feb. 16, 2023

(30) Foreign Application Priority Data

Aug. 11, 2021 (JP) ................................. 2021-131402

(51) Int. Cl.
*E02F 9/22* (2006.01)
*F16H 61/47* (2010.01)
*F16H 61/421* (2010.01)

(52) U.S. Cl.
CPC .......... *E02F 9/2253* (2013.01); *E02F 9/2235* (2013.01); *E02F 9/2296* (2013.01); *F16H 61/421* (2013.01); *F16H 61/47* (2013.01)

(58) Field of Classification Search
CPC .... E02F 9/2253; F16H 61/421; F16H 61/423; F16H 61/425; F16H 61/47; F16H 61/478
See application file for complete search history.

(56) References Cited

U.S. PATENT DOCUMENTS

| | | | | |
|---|---|---|---|---|
| 5,683,322 A | * | 11/1997 | Meyerle | B60W 10/10 475/72 |
| 5,890,468 A | * | 4/1999 | Ozawa | F02B 33/32 123/561 |
| 6,481,314 B2 | * | 11/2002 | Nemoto | F16H 47/02 74/733.1 |
| 6,609,368 B2 | * | 8/2003 | Dvorak | F16D 31/00 91/519 |
| 11,391,018 B2 | * | 7/2022 | Fukuda | B62D 11/06 |

FOREIGN PATENT DOCUMENTS

JP 2017-179923 A 10/2017

* cited by examiner

*Primary Examiner* — Michael Leslie
(74) *Attorney, Agent, or Firm* — KEATING AND BENNETT, LLP

(57) ABSTRACT

A hydraulic system for a working machine includes a traveling motor to output power to a traveling device in the working machine, a first detector to detect a physical quantity that changes in accordance with a traveling state of the working machine and that is detected at intervals of a predetermined period, and a controller to execute automatic shift-down to automatically reduce a rotational speed of the traveling motor to a first speed stage when the rotational speed of the traveling motor is in a second speed stage higher than the first speed stage. The controller is configured or programmed to determine a tendency or degree of change in the physical quantity, based on values of the physical quantity detected at intervals of the predetermined period by the first detector.

19 Claims, 15 Drawing Sheets

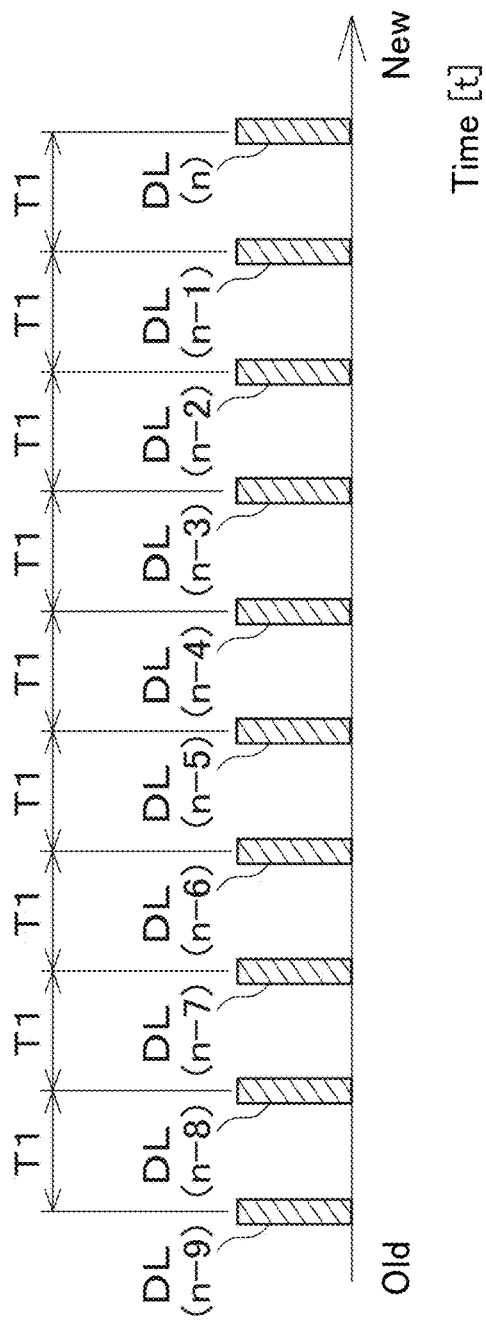

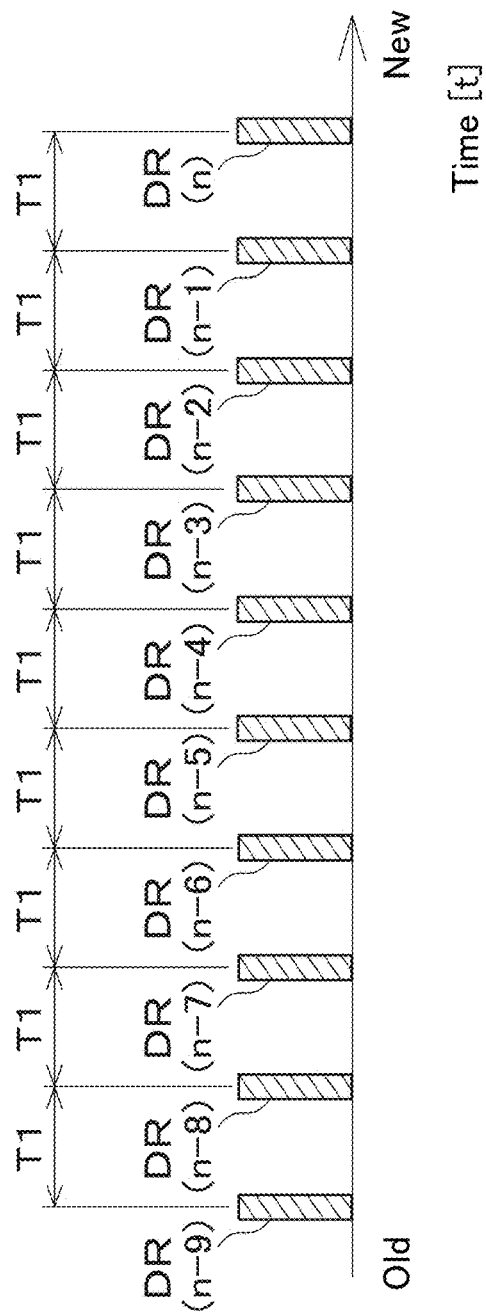

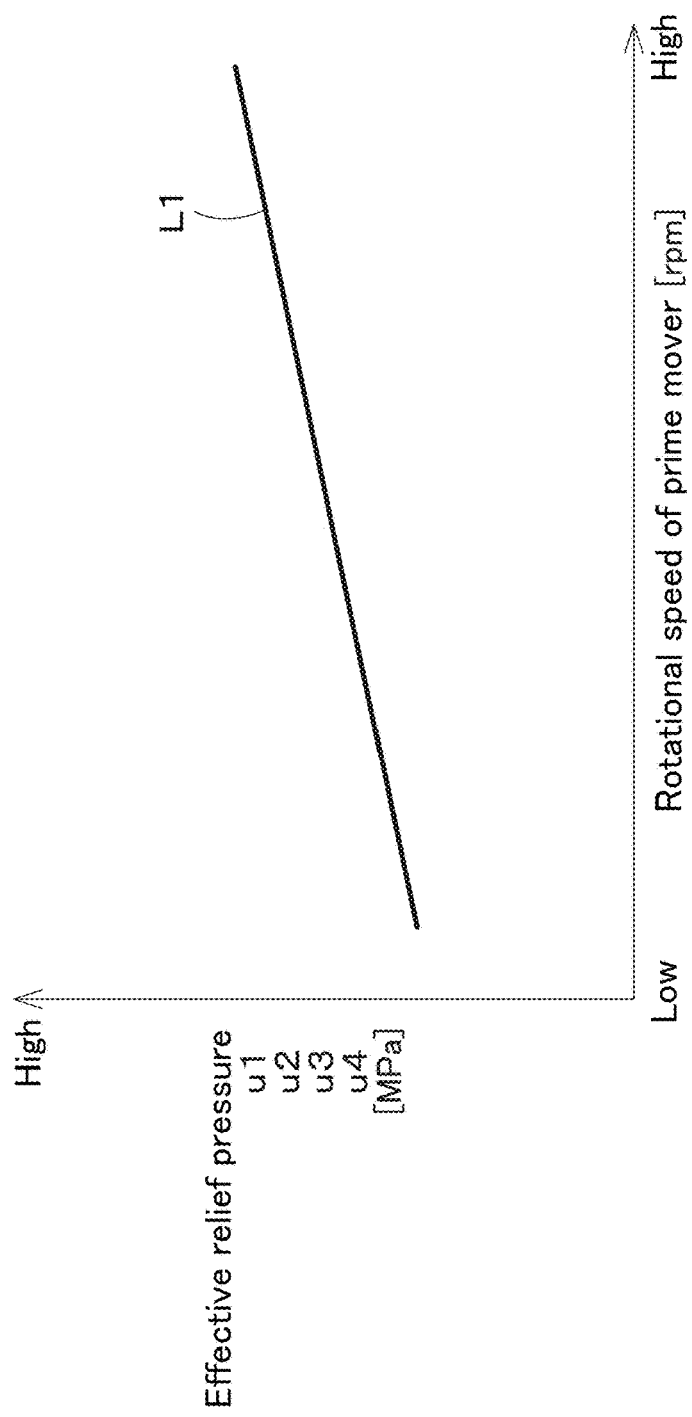

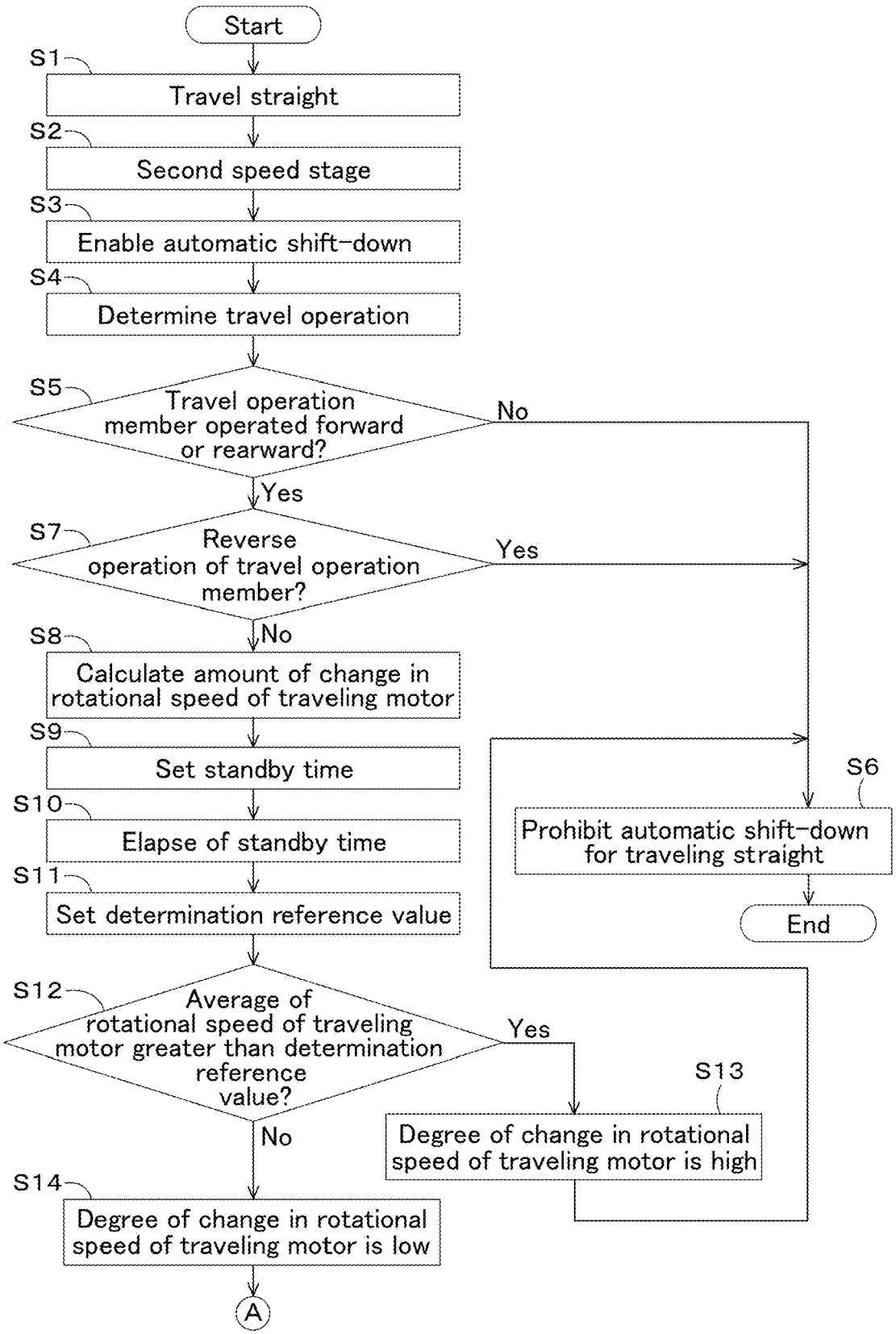

HYDRAULIC SYSTEM FOR WORKING MACHINE, AND WORKING MACHINE

CROSS REFERENCE TO RELATED APPLICATIONS

This application claims the benefit of priority to Japanese Patent Application No. 2021-131402 filed on Aug. 11, 2021. The entire contents of this application are hereby incorporated herein by reference.

BACKGROUND OF THE INVENTION

1. Field of the Invention

The present invention relates to a working machine, such as a skid-steer loader, a compact track loader, or a backhoe, and a hydraulic system for the working machine.

2. Description of the Related Art

Japanese Unexamined Patent Application Publication No. 2017-179923 discloses a technique for decelerating a working machine. A hydraulic system for the working machine disclosed in Japanese Unexamined Patent Application Publication No. 2017-179923 includes a prime mover, a hydraulic pump activated by the power of the prime mover and configured to deliver hydraulic fluid, a traveling device (hydraulic traveling device) in which a speed stage is shiftable between a first speed stage and a second speed stage higher than the first speed stage in accordance with the pressure of the hydraulic fluid, an operation valve capable of changing the pressure of the hydraulic fluid acting on the traveling device, and a measurement device capable of detecting the pressure of the hydraulic fluid. When the pressure of the hydraulic fluid detected by the measurement device is decreased to a predetermined value or less from a pressure corresponding to the second speed stage, the operation valve decreases the pressure of the hydraulic fluid acting on the traveling device to shift down a speed stage of the traveling device to the first speed stage.

SUMMARY OF THE INVENTION

The hydraulic system for the working machine disclosed in Japanese Unexamined Patent Application Publication No. 2017-179923 performs automatic shift-down on the basis of the result of comparison between the pressure of the hydraulic fluid detected by the measurement device and a predetermined threshold. However, when acceleration is required, such as when the working machine starts from a stop position and when the working machine increases its speed from a low-speed traveling state, the pressure of the hydraulic fluid temporarily fluctuates up and down, which may unintentionally activate automatic shift-down.

Preferred embodiments of the present invention each activate automatic shift-down in accordance with a traveling state of a working machine.

Preferred embodiments of the present invention include the technical features described in the following.

A hydraulic system for a working machine according to one or more aspects of various preferred embodiments of the present invention includes a traveling motor to output power to a traveling device in the working machine, a first detector to detect a physical quantity that changes in accordance with a traveling state of the working machine and is detected at intervals of a predetermined period, and a controller to execute automatic shift-down to automatically shift down a speed stage for a rotational speed of the traveling motor from a second speed stage to a first speed stage in which the rotational speed of the traveling motor is lower than the rotational speed of the traveling motor in the second speed stage. The controller is configured or programmed to determine a tendency or degree of change in the physical quantity, based on a plurality of values of the physical quantity detected at intervals of the predetermined period by the first detector.

A working machine according to one or more aspects of various preferred embodiments of the present invention includes a traveling device to support a machine body of the working machine so as to allow the machine body to travel, and the hydraulic system for a working machine described above.

In one aspect of a preferred embodiment of the present invention, the controller may be configured or programmed to calculate an amount of temporal change in the physical quantity based on the detected plurality of values of the physical quantity, make a determination of the tendency or degree of change in the physical quantity based on the calculated amount of temporal change, and execute the automatic shift-down in accordance with a result of the determination.

In one aspect of a preferred embodiment of the present invention, the controller may be configured or programmed to hold a predetermined number of the detected values of the physical quantity, the predetermined number being two or more, in response to detection of a new value of the physical quantity by the first detector, hold the new value of the physical quantity in place of an oldest value among the held values of the physical quantity, calculate an average of the held values of the physical quantity, and hold a predetermined number of the averages, the predetermined number being two or more, and calculate a difference between a latest average and an oldest average among the held averages as the amount of temporal change in the physical quantity.

In one aspect of a preferred embodiment of the present invention, the controller may be configured or programmed to, in response to a determination being made that the change in the physical quantity has a tendency corresponding to an increase in a travel speed of the working machine, restrain the automatic shift-down such that the automatic shift-down becomes difficult to activate as the degree of change in the physical quantity increases.

In one aspect of a preferred embodiment of the present invention, the controller may be configured or programmed to set a shift-down threshold, based on the tendency or degree of change in the physical quantity, the shift-down threshold being a threshold for determining whether to execute the automatic shift-down.

In one aspect of a preferred embodiment of the present invention, the hydraulic system for a working machine may further include a traveling pump to supply hydraulic fluid to the traveling motor to drive the traveling motor, a circulation fluid passage connected to the traveling pump and the traveling motor, a relief valve connected to the circulation fluid passage, a prime mover defining a power source of the traveling pump, and a second detector to detect a rotational speed of the prime mover. The controller may be configured or programmed to set the shift-down threshold, based on the tendency or degree of change in the physical quantity, an effective relief pressure of the relief valve corresponding to the rotational speed of the prime mover detected by the second detector, a first coefficient corresponding to the rotational speed of the prime mover detected by the second detector, and a second coefficient corresponding to an amount of temporal change in the physical quantity calculated from the plurality of values of the physical quantity.

In one aspect of a preferred embodiment of the present invention, the controller may be configured or programmed to set a value greater than 0 and less than 1 as the first coefficient, set a value greater than or equal to 1 as the second coefficient, set a value greater than 1 as the second coefficient when the change in the physical quantity has a tendency corresponding to an increase in a travel speed of the working machine, and multiply the effective relief pressure, the first coefficient, and the second coefficient to set the shift-down threshold.

In one aspect of a preferred embodiment of the present invention, the hydraulic system for a working machine may further include a traveling pump to supply hydraulic fluid to the traveling motor to drive the traveling motor, a circulation fluid passage connected to the traveling pump and the traveling motor, and a third detector to detect a travel pressure, the travel pressure being a pressure of the hydraulic fluid acting on the circulation fluid passage during a rotation of the traveling motor. The controller may be configured or programmed to execute the automatic shift-down, based on the travel pressure detected by the third detector and the shift-down threshold, when the rotational speed of the traveling motor is in the second speed stage.

In one aspect of a preferred embodiment of the present invention, the controller may be configured or programmed to execute the automatic shift-down, based on the travel pressure and the shift-down threshold, when the working machine is traveling straight and the rotational speed of the traveling motor is in the second speed stage.

In one aspect of a preferred embodiment of the present invention, the hydraulic system for a working machine may further include a travel operation member to operate driving of the traveling pump. The controller may be configured or programmed to determine that the working machine is traveling straight, based on an operating state of the travel operation member.

In one aspect of a preferred embodiment of the present invention, the controller may be configured or programmed to execute the automatic shift-down in response to an effective travel pressure calculated based on the travel pressure being greater than or equal to the shift-down threshold.

In one aspect of a preferred embodiment of the present invention, the controller may be configured or programmed to execute the automatic shift-down in response to a high-effective-travel-pressure state continuing for a predetermined determination time, the high-effective-travel-pressure state being a state in which the effective travel pressure remains greater than or equal to the shift-down threshold, and set the determination time, based on an amount of change in the physical quantity calculated from the plurality of values of the physical quantity.

In one aspect of a preferred embodiment of the present invention, the controller may be configured or programmed to prohibit the automatic shift-down in response to a determination being made that the change in the physical quantity has a tendency corresponding to an increase in a travel speed of the working machine.

In one aspect of a preferred embodiment of the present invention, the hydraulic system for a working machine may further include a traveling pump to supply hydraulic fluid to the traveling motor to drive the traveling motor, a prime mover defining a power source of the traveling pump, and a second detector to detect a rotational speed of the prime mover. The controller may be configured or programmed to determine the degree of change in the physical quantity, based on an average of the plurality of values of the physical quantity and the rotational speed of the prime mover detected by the second detector.

In one aspect of a preferred embodiment of the present invention, the controller may be configured or programmed to determine that the degree of change in the physical quantity is large in response to the average of the plurality of values of the physical quantity being greater than a determination reference value corresponding to the rotational speed of the prime mover, and prohibits the automatic shift-down.

In one aspect of a preferred embodiment of the present invention, the hydraulic system for a working machine may further include a traveling pump to supply hydraulic fluid to the traveling motor to drive the traveling motor, and a travel operation member to operate driving of the traveling pump. The controller may be configured or programmed to prohibit the automatic shift-down in response to detection of operation of the travel operation member in a direction corresponding to a direction opposite to a direction in which the working machine is traveling.

In one aspect of a preferred embodiment of the present invention, the hydraulic system for a working machine may further include a traveling pump to supply hydraulic fluid to the traveling motor to drive the traveling motor, and a travel operation member to operate driving of the traveling pump. The controller may be configured or programmed to set a standby time, based on the plurality of values of the physical quantity, in response to detection of operation of the travel operation member in a direction corresponding to straight traveling of the working machine, and make a determination of the tendency and degree of change in the physical quantity in response to an elapse of the standby time.

In one aspect of a preferred embodiment of the present invention, the first detector may detect the rotational speed of the traveling motor as the physical quantity at intervals of the predetermined period. The controller may be configured or programmed to determine a tendency or degree of change in the rotational speed, based on a plurality of values of the rotational speed of the traveling motor detected at intervals of the predetermined period by the first detector.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 3A is a diagram illustrating data of a rotational speed of a left traveling motor according to the preferred embodiment.

FIG. 3B is a diagram illustrating data of a rotational speed of a right traveling motor according to the preferred embodiment.

FIG. 4 is a graph illustrating an example of a correlation between a rotational speed of a prime mover and an effective relief pressure according to the preferred embodiment.

FIG. 5A is a flowchart illustrating an automatic shift-down determination process for straight traveling according to a first preferred embodiment.

DETAILED DESCRIPTION OF THE PREFERRED EMBODIMENTS

Figure 1:
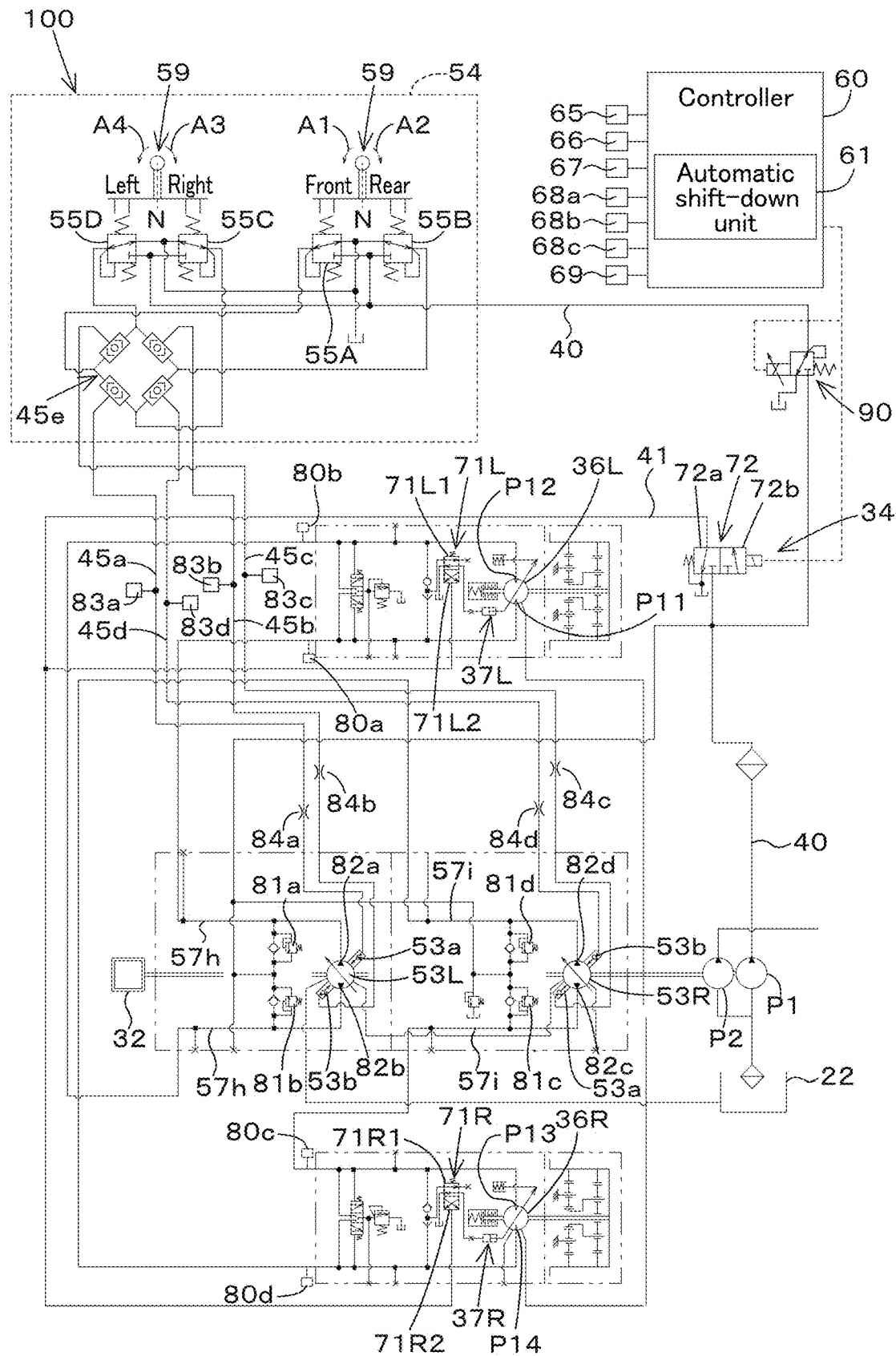
FIG. 1 is a diagram illustrating a hydraulic system for a working machine according to a preferred embodiment.

The preferred embodiments will now be described with reference to the accompanying drawings, wherein like reference numerals designate corresponding or identical elements throughout the various drawings. The drawings are to be viewed in an orientation in which the reference numerals are viewed correctly.

Preferred embodiments of the present invention will be described hereinafter with reference to the drawings as appropriate.

Figure 12:
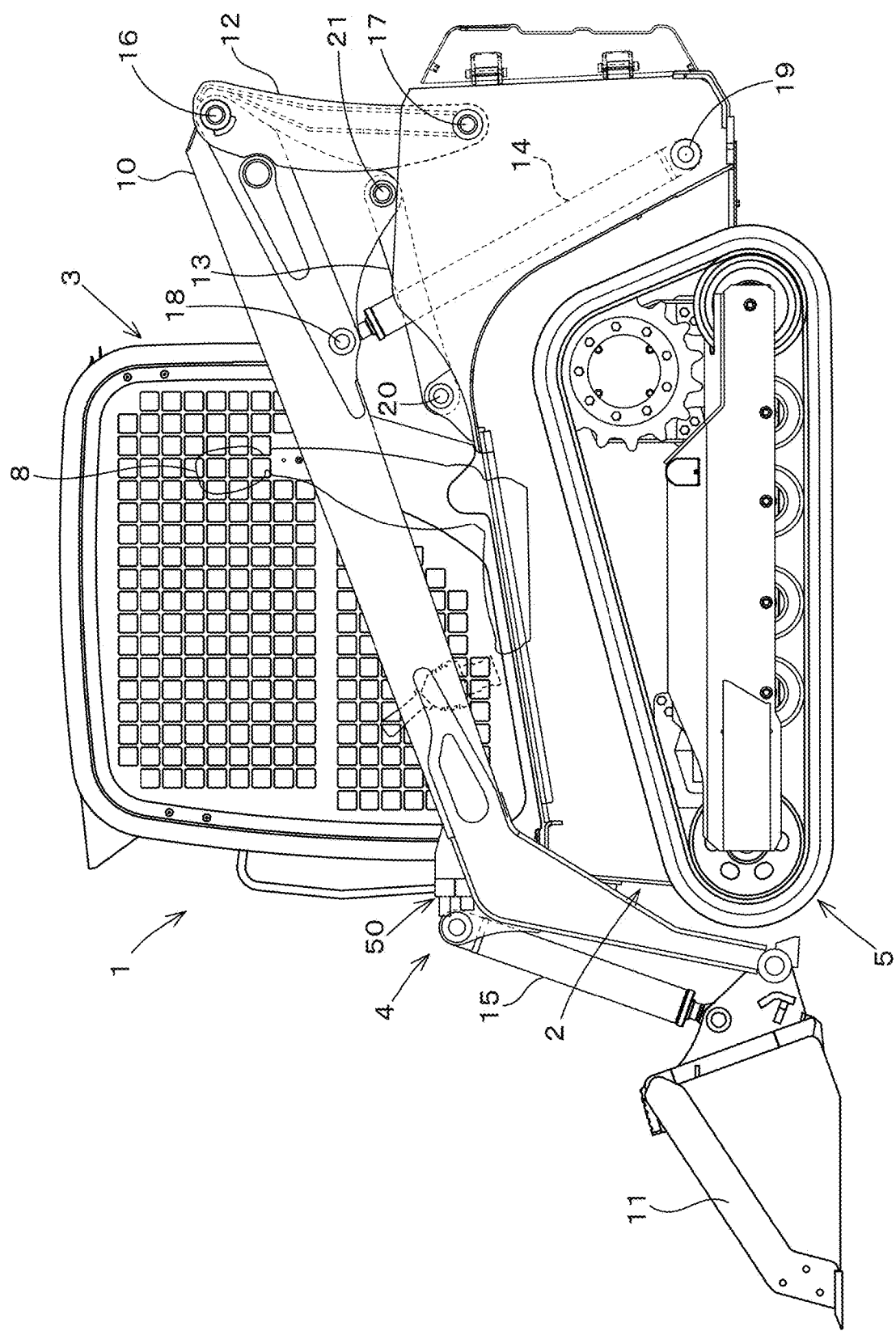
FIG. 12 is a side view of a working machine according to preferred embodiments.

FIG. 12 is a side view of a working machine 1 according to the preferred embodiments. FIG. 12 illustrates a compact track loader as an example of the working machine 1. In some preferred embodiments of the present invention, the working machine is not limited to a compact track loader and may be any other type of loader working machine such as a skid-steer loader, for example. The working machine may be a working machine other than a loader working machine.

As illustrated in FIG. 12, the working machine 1 includes a machine body 2, a cabin 3, a working device 4, and a pair of traveling devices 5L and 5R. The cabin 3 is mounted on the machine body 2. The cabin 3 is provided with an operator's seat 8.

In preferred embodiments of the present invention, a direction ahead of a driver seated on the operator's seat 8 of the working machine 1 (a direction on the left side in FIG. 12) is defined as a front or forward direction, a direction behind the driver (a direction on the right side in FIG. 12) is defined as a rear or rearward direction, a direction to the left of the driver (a direction closer to the viewer in FIG. 12) is defined as a left direction, and a direction to the right of the driver (a direction farther away from the viewer in FIG. 12) is defined as a right direction. A horizontal direction that is a direction orthogonal to the front-rear direction is defined as a machine-body width direction. A direction to the right or left from the center of the machine body 2 is defined as a machine-body outward direction. In other words, the machine-body outward direction is the machine-body width direction and is a direction away from the machine body 2. A direction opposite to the machine-body outward direction is defined as a machine-body inward direction. In other words, the machine-body inward direction corresponds to the machine-body width direction and is a direction approaching the machine body 2.

The working device 4 is attached to the machine body 2. The pair of traveling devices 5L and 5R are disposed at outer portions of the machine body 2 and support the machine body 2 so as to allow the machine body 2 to travel. The machine body 2 includes a prime mover 32 (see FIG. 1 described below) in a rear portion thereof.

The working device 4 includes booms 10, a working tool 11, lift links 12, control links 13, boom cylinders 14, and bucket cylinders 15.

The booms 10 are each disposed on a corresponding one of the right and left sides of the cabin 3 so as to be swingable up and down. The working tool 11 is a bucket, for example. In the following, the working tool 11 may also be referred to as the bucket 11. The bucket 11 is disposed at distal ends (front ends) of the booms 10 so as to be swingable up and down. The lift links 12 and the control links 13 support base portions (rear portions) of the booms 10 so as to make the booms 10 swingable up and down. The boom cylinders 14 extend or contract to raise or lower the booms 10. The bucket cylinders 15 extend or contract to swing the bucket 11.

Front portions of the booms 10 on the left and right sides of the machine body 2 are coupled to each other by an odd-shaped coupling pipe. The base portions (rear portions) of the booms 10 are coupled to each other by a circular-shaped coupling pipe.

The lift links 12, the control links 13, and the boom cylinders 14 are disposed on the left and right sides of the machine body 2 such that the lift link 12, the control link 13, and the boom cylinder 14 on the left side of the machine body 2 correspond to the boom 10 on the left side of the machine body 2 and the lift link 12, the control link 13, and the boom cylinder 14 on the right side of the machine body 2 correspond to the boom 10 on the right side of the machine body 2.

The lift links 12 are disposed upright at the rear portions of the base portions of the respective booms 10. Upper portions (first ends) of the lift links 12 are pivotally supported by the rear portions of the base portions of the respective booms 10 through respective pivot shafts 16 (first pivot shafts) so as to be rotatable about respective lateral axes defined by the pivot shafts 16. Lower portions (second ends) of the lift links 12 are pivotally supported by a rear portion of the machine body 2 through respective pivot shafts 17 (second pivot shafts) so as to be rotatable about respective lateral axes defined by the pivot shafts 17. The second pivot shafts 17 are disposed below the first pivot shafts 16.

Upper portions of the boom cylinders 14 are pivotally supported through respective pivot shafts 18 (third pivot shafts) so as to be rotatable about respective lateral axes defined by the pivot shafts 18. The third pivot shafts 18 are disposed at front portions of the base portions of the booms 10. Lower portions of the boom cylinders 14 are pivotally supported through respective pivot shafts 19 (fourth pivot shafts) so as to be rotatable about respective lateral axes defined by the pivot shafts 19. The fourth pivot shafts 19 are disposed at a lower portion of the rear portion of the machine body 2 and below the third pivot shafts 18.

The control links 13 are disposed in front of the lift links 12. The control links 13 have first ends that are pivotally supported through respective pivot shafts 20 (fifth pivot shafts) so as to be rotatable about respective lateral axes defined by the pivot shafts 20. The fifth pivot shafts 20 are disposed in the machine body 2 at positions in front of the lift links 12. The control links 13 have second ends that are pivotally supported through respective pivot shafts 21 (sixth pivot shafts) so as to be rotatable about respective lateral axes defined by the pivot shafts 21. The sixth pivot shafts 21 are disposed at portions of the booms 10 in front of the second pivot shafts 17 and above the second pivot shafts 17.

In response to extension or contraction of the boom cylinders 14, the lift links 12 and the control links 13 allow the booms 10 to swing up or down around the first pivot shafts 16 while supporting the base portions of the booms 10. As a result, the distal ends of the booms 10 are raised or lowered. As the booms 10 swing up and down, the control links 13 swing up and down around the fifth pivot shafts 20. As the control links 13 swing up and down, the lift links 12 swing back and forth around the second pivot shafts 17.

In place of the bucket 11, another working tool is attachable to the front portions of the booms 10. Examples of the other working tool include attachments (auxiliary attachments) such as a hydraulic crusher, a hydraulic breaker, an angle broom, an earth auger, a pallet fork, a sweeper, a mower, and a snow blower.

A connection member 50 is disposed in the front portion of the boom 10 on the left side of the machine body 2. The connection member 50 is a device that connects a hydraulic device included in an auxiliary attachment and a first pipe member such as a pipe in the boom 10. Specifically, the connection member 50 has a first end connectable to the first pipe member, and a second end connectable to a second pipe member connected to the hydraulic device of the auxiliary attachment. With this configuration, the hydraulic fluid flowing through the first pipe member passes through the second pipe member and is supplied to the hydraulic device.

The bucket cylinders 15 are arranged near the front portions of the respective booms 10. The bucket cylinders 15 extend or contract to swing the bucket 11.

Of the pair of traveling devices 5L and 5R, the traveling device 5L is disposed on the left side of the machine body 2, and the traveling device 5R is disposed on the right side of the machine body 2. In the preferred embodiments, the pair of traveling devices 5L and 5R are each implemented as a crawler (or semi-crawler) traveling device. A wheeled traveling device having at least one front wheel and at least one rear wheel, or a traveling device having wheels and crawlers may be used. In the following, the traveling device 5L may be referred to as the left traveling device 5L, and the traveling device 5R may be referred to as the right traveling device 5R, for convenience of description.

The prime mover 32 is an internal combustion engine such as a diesel engine or a gasoline engine, or an electric motor, for example. In the preferred embodiments, a diesel engine is used as the prime mover 32, but the prime mover 32 is not limited thereto.

FIG. 1 is a diagram illustrating a hydraulic system (hydraulic circuit) 100 of a traveling system mounted on the working machine 1. The hydraulic system 100 includes a first hydraulic pump P1 and a second hydraulic pump P2. The first hydraulic pump P1 is a pump driven by the power of the prime mover 32 and is a fixed-displacement gear pump, for example. The first hydraulic pump P1 is capable of delivering hydraulic fluid stored in a tank 22. In particular, the first hydraulic pump P1 delivers hydraulic fluid to be mainly used for controlling a hydraulic device included in the working machine 1. For convenience of description, hydraulic fluid that is delivered from the first hydraulic pump P1 and that is to be used for control is referred to as pilot fluid, and the pressure of the pilot fluid is referred to as pilot pressure.

The second hydraulic pump P2 is a pump driven by the power of the prime mover 32 and is a fixed-displacement gear pump, for example. The second hydraulic pump P2 is capable of delivering the hydraulic fluid stored in the tank 22, and supplies the hydraulic fluid to a fluid passage of a working system, for example. For example, the second hydraulic pump P2 supplies the hydraulic fluid to the boom cylinders 14 to activate the booms 10, the bucket cylinders 15 to activate the bucket 11, and a control valve (flow control valve) to control an auxiliary hydraulic actuator.

The hydraulic system 100 for the working machine 1 further includes a pair of traveling motors 36L and 36R and a pair of traveling pumps 53L and 53R. The pair of traveling motors 36L and 36R are hydraulic motors that transmit power to the pair of traveling devices 5L and 5R, respectively. Of the pair of traveling motors 36L and 36R, the traveling motor 36L outputs rotational power to the left traveling device 5L, and the traveling motor 36R outputs rotational power to the right traveling device 5R.

Each of the traveling pump 53L and the traveling pump 53R is a hydraulic pump driven by the power of the prime mover 32, and is a swash-plate variable displacement axial pump, for example. The traveling pump 53L is rotationally driven to supply the hydraulic fluid to the traveling motor 36L. The traveling pump 53R is rotationally driven to supply the hydraulic fluid to the traveling motor 36R.

In the following, the traveling pump 53L is referred to as the left traveling pump 53L, the traveling pump 53R is referred to as the right traveling pump 53R, the traveling motor 36L is referred to as the left traveling motor 36L, and the traveling motor 36R is referred to as the right traveling motor 36R, for convenience of description. The traveling pump 53L and the traveling pump 53R are collectively referred to as the traveling pumps 53L and 53R. The traveling motor 36L and the traveling motor 36R are collectively referred to as the traveling motors 36L and 36R.

Each of the traveling pumps 53L and 53R includes a pressure receiver 53*a* and a pressure receiver 53*b*, on which pilot pressures of the pilot fluid delivered from the first hydraulic pump P1 act. The pilot pressures acting on the pressure receivers 53*a* and 53*b* change angles of swash plates included in the traveling pumps 53L and 53R. The angles of the swash plates are changed to change outputs of the traveling pumps 53L and 53R (delivery amounts of the hydraulic fluid) and delivery directions of the hydraulic fluid therefrom.

The left traveling pump 53L includes a first port 82a and a second port 82b. The hydraulic fluid is delivered from the first port 82a in the direction for forward rotation of the left traveling motor 36L. The hydraulic fluid is delivered from the second port 82b in the direction for reverse rotation of the left traveling motor 36L. The right traveling pump 53R includes a third port 82c and a fourth port 82d. The hydraulic fluid is delivered from the third port 82c in the direction for forward rotation of the right traveling motor 36R. The hydraulic fluid is delivered from fourth port 82d in the direction for reverse rotation of the right traveling motor 36R.

The first port 82a and the second port 82b of the left traveling pump 53L are each connected to the left traveling motor 36L by a first circulation fluid passage 57h. The hydraulic fluid delivered from the left traveling pump 53L flows through the first circulation fluid passage 57h and is supplied to the left traveling motor 36L. The third port 82c and the fourth port 82d of the right traveling pump 53R are each connected to the right traveling motor 36R by a second circulation fluid passage 57i. The hydraulic fluid delivered from the right traveling pump 53R flows through the second circulation fluid passage 57i and is supplied to the right traveling motor 36R.

A first relief valve 81a is connected to a portion of the first circulation fluid passage 57h corresponding to the first port 82a of the left traveling pump 53L. A second relief valve 81b is connected to another portion of the first circulation fluid passage 57h corresponding to the second port 82b of the left traveling pump 53L. For example, when the left traveling pump 53L is driven to rotate forward to increase the pressure of the hydraulic fluid acting on the first circulation fluid passage 57h, the first relief valve 81a is easily activated. When the left traveling pump 53L is driven to rotate in reverse to increase the pressure of the hydraulic fluid acting on the first circulation fluid passage 57h, the second relief valve 81b is easily activated.

A third relief valve 81c is connected to a portion of the second circulation fluid passage 57i corresponding to the third port 82c of the right traveling pump 53R. A fourth relief valve 81d is connected to another portion of the second circulation fluid passage 57i corresponding to the fourth port 82d of the right traveling pump 53R. For example, when the right traveling pump 53R is driven to rotate forward to increase the pressure of the hydraulic fluid acting on the second circulation fluid passage 57i, the third relief valve 81c is easily activated. When the right traveling pump 53R is driven to rotate in reverse to increase the pressure of the hydraulic fluid acting on the second circulation fluid passage 57i, the fourth relief valve 81d is easily activated.

The left traveling motor 36L is rotationally driven by the hydraulic fluid delivered from the left traveling pump 53L. The direction of the hydraulic fluid to be supplied from the left traveling pump 53L to the left traveling motor 36L through the first circulation fluid passage 57h is switched to drive the left traveling motor 36L to rotate forward or in reverse. Further, the flow rate of the hydraulic fluid to be supplied from the left traveling pump 53L to the left traveling motor 36L through the first circulation fluid passage 57h is changed to change the rotational speed of the left traveling motor 36L.

A swash-plate switching cylinder 37L is connected to the left traveling motor 36L. The rotational speed of the left traveling motor 36L is also changed by extending or contracting the swash-plate switching cylinder 37L. More specifically, in response to contraction of the swash-plate switching cylinder 37L, the rotational speed of the left traveling motor 36L is set to a low speed in a first speed stage. In response to extension of the swash-plate switching cylinder 37L, the rotational speed of the left traveling motor 36L is set to a high speed in a second speed stage, which is faster than the rotational speed in the first speed stage. That is, the speed stage for the rotational speed of the left traveling motor 36L is switchable between the low-speed first speed stage and the high-speed second speed stage.

The right traveling motor 36R is rotationally driven by the hydraulic fluid delivered from the right traveling pump 53R. The direction of the hydraulic fluid to be supplied from the right traveling pump 53R to the right traveling motor 36R through the second circulation fluid passage 57i is switched to drive the right traveling motor 36R to rotate forward or in reverse. Further, the flow rate of the hydraulic fluid to be supplied from the right traveling pump 53R to the right traveling motor 36R through the second circulation fluid passage 57i is changed to change the rotational speed of the right traveling motor 36R.

A swash-plate switching cylinder 37R is connected to the right traveling motor 36R. The rotational speed of the right traveling motor 36R is also changed by extending or contracting the swash-plate switching cylinder 37R. More specifically, in response to contraction of the swash-plate switching cylinder 37R, the rotational speed of the right traveling motor 36R is set to a low speed in a first speed stage. In response to extension of the swash-plate switching cylinder 37R, the rotational speed of the right traveling motor 36R is set to a high speed in a second speed stage, which is higher than the rotational speed in the first speed stage. That is, the speed stage for the rotational speed of the right traveling motor 36R is switchable between the low-speed first speed stage and the high-speed second speed stage.

A plurality of first pressure detectors 80a to 80d are connected to the circulation fluid passages 57h and 57i. The first pressure detector 80a is disposed in the first circulation fluid passage 57h at a position adjacent to a first port P11 of the left traveling motor 36L and detects the pressure of the hydraulic fluid near the first port P11 as a first travel pressure LF. The first pressure detector 80b is disposed in the first circulation fluid passage 57h at a position adjacent to a second port P12 of the left traveling motor 36L and detects the pressure of the hydraulic fluid near the second port P12 as a second travel pressure LB. The first pressure detector 80c is disposed in the second circulation fluid passage 57i at a position adjacent to a third port P13 of the right traveling motor 36R and detects the pressure of the hydraulic fluid near the third port P13 as a third travel pressure RF. The first pressure detector 80d is disposed in the second circulation fluid passage 57i at a position adjacent to a fourth port P14 of the right traveling motor 36R and detects the pressure of the hydraulic fluid near the fourth port P14 as a fourth travel pressure RB. As described above, the first pressure detectors 80a to 80d detect the first to fourth travel pressures LF, LB, RF, and RB, respectively, at intervals of a predetermined period.

As illustrated in FIG. 1, the hydraulic system 100 includes a travel switching valve 34. The travel switching valve 34 includes first switching valves 71L and 71R and a second switching valve 72. The switching valves 71L, 71R, and 72 are switchable between a first state for setting the speed stage for the rotational speeds of the traveling motors 36L and 36R to the first speed stage and a second state for setting the speed stage for the rotational speeds of the traveling motors 36L and 36R to the second speed stage.

The first switching valve 71L is connected to the swash-plate switching cylinder 37L of the left traveling motor 36L through a fluid passage. The first switching valve 71L is a two-position switching valve capable of switching between a first position 71L1 and a second position 71L2. The swash-plate switching cylinder 37L contracts when the first switching valve 71L is in the first position 71L1. The swash-plate switching cylinder 37L extends when the first switching valve 71L is in the second position 71L2.

The first switching valve 71R is connected to the swash-plate switching cylinder 37R of the right traveling motor 36R through a fluid passage. The first switching valve 71R is a two-position switching valve capable of switching between a first position 71R1 and a second position 71R2. The swash-plate switching cylinder 37R contracts when the first switching valve 71R is in the first position 71R1. The swash-plate switching cylinder 37R extends when the first switching valve 71R is in the second position 71R2.

The second switching valve 72 is a solenoid valve capable of switching the first switching valves 71L and 71R. More specifically, the second switching valve 72 is an electromagnetic two-position switching valve capable of switching between a first position 72a and a second position 72b. The position of the second switching valve 72 is switchable by a controller 60.

A fluid passage 41 is branched into three passages. A first end of the fluid passage 41 is connected to the second switching valve 72. A second end of the fluid passage 41 is connected to the first switching valve 71L. A third end of the fluid passage 41 is connected to the first switching valve 71R.

When the solenoid in the second switching valve 72 is deenergized, the second switching valve 72 is switched to the first position 72a and switches the first switching valves 71L and 71R to the first positions 71L1 and 71R1, respectively. When the solenoid in the second switching valve 72 is energized, the second switching valve 72 is switched to the second position 72b and switches the first switching valves 71L and 71R to the second positions 71L2 and 71R2, respectively.

When the second switching valve 72 is in the first position 72a, the first switching valve 71L is in the first position 71L1, and the first switching valve 71R is in the first position 71R1, the travel switching valve 34 enters the first state and sets the speed stage for the rotational speeds of the traveling motors 36L and 36R to the low-speed first speed stage. When the second switching valve 72 is in the second position 72b, the first switching valve 71L is in the second position 71L2, and the first switching valve 71R is in the second position 71R2, the travel switching valve 34 enters the second state and sets the speed stage for the rotational speeds of the traveling motors 36L and 36R to the high-speed second speed stage. That is, the position of the travel switching valve 34 can be switched to switch the traveling motors 36L and 36R in the speed stage between the low-speed first speed stage and the high-speed second speed stage.

A travel operation device 54 includes a travel operation member 59 (operation member) and operation valves 55 (55A to 55D). When the travel operation member 59 is operated, the travel operation device 54 causes the hydraulic fluid to act on the pressure receivers 53a and 53b of the traveling pumps 53L and 53R to change the angles of the swash plates of the traveling pumps 53L and 53R.

The travel operation member 59 is a lever operation member and is supported by the operation valves 55A to 55D. The travel operation member 59 is swingable in the left-right direction (machine-body width direction) from a neutral position N as a reference and is swingable in the front-rear direction from the neutral position N. In other words, the travel operation member 59 is swingable in at least four directions relative to the neutral position N.

The plurality of operation valves 55A to 55D are operated by the common, or single, travel operation member 59. The operation valves 55A to 55D are activated in response to swinging of the travel operation member 59. The operation valves 55A to 55D are connected to a delivery fluid passage 40. An anti-stall proportional valve 90 is also connected to the delivery fluid passage 40.

The anti-stall proportional valve 90 is a solenoid proportional valve. The opening of the anti-stall proportional valve 90 is changed in accordance with the drop (the amount of reduction) in the rotational speed of the prime mover 32 to change the pilot pressure, which is the pressure of the pilot fluid delivered from the first hydraulic pump P1 to the delivery fluid passage 40. As a result, the stall of the prime mover 32, that is, an engine stall, can be prevented. The pilot fluid delivered from the first hydraulic pump P1 to the delivery fluid passage 40 passes through the anti-stall proportional valve 90 and is supplied to the operation valves 55A to 55D.

In response to an operation of the travel operation member 59 to swing forward in the front-rear direction (first direction), the pressure of the hydraulic fluid to be output from the operation valve 55A is changed in accordance with the amount of operation. In response to an operation of the travel operation member 59 to swing rearward, the pressure of the hydraulic fluid to be output from the operation valve 55B is changed in accordance with the amount of operation. In response to an operation of the travel operation member 59 to swing to the right in the left-right direction (second direction), the pressure of the hydraulic fluid to be output from the operation valve 55C is changed in accordance with the amount of operation. In response to an operation of the travel operation member 59 to swing to the left, the pressure of the hydraulic fluid to be output from the operation valve 55D is changed in accordance with the amount of operation.

The plurality of operation valves 55A to 55D are connected to the traveling pumps 53L and 53R by travel fluid passages 45a to 45d. The traveling pumps 53L and 53R are activated by the hydraulic fluid output from the operation valves 55A to 55D.

The travel fluid passages 45a to 45d include a first travel fluid passage 45a, a second travel fluid passage 45b, a third travel fluid passage 45c, and a fourth travel fluid passage 45d. The first travel fluid passage 45a is connected to the pressure receiver (first pressure receiver) 53a of the left traveling pump 53L. When the travel operation member 59 is operated, the first travel fluid passage 45a allows the hydraulic fluid acting on the pressure receiver 53a of the left traveling pump 53L to pass therethrough. The second travel fluid passage 45b is connected to the pressure receiver (second pressure receiver) 53b of the left traveling pump 53L. When the travel operation member 59 is operated, the second travel fluid passage 45b allows the hydraulic fluid acting on the pressure receiver 53b to pass therethrough.

The third travel fluid passage 45c is connected to the pressure receiver (third pressure receiver) 53a of the right traveling pump 53R. When the travel operation member 59 is operated, the third travel fluid passage 45c allows the hydraulic fluid acting on the pressure receiver 53a of the right traveling pump 53R to pass therethrough. The fourth travel fluid passage 45d is connected to the pressure receiver (fourth pressure receiver) 53b of the right traveling pump 53R. When the travel operation member 59 is operated, the fourth travel fluid passage 45d allows the hydraulic fluid acting on the pressure receiver 53b of the right traveling pump 53R to pass therethrough. A fifth travel fluid passage 45e connects the operation valves 55A to 55D to the travel fluid passages 45a to 45d.

Figure 2:
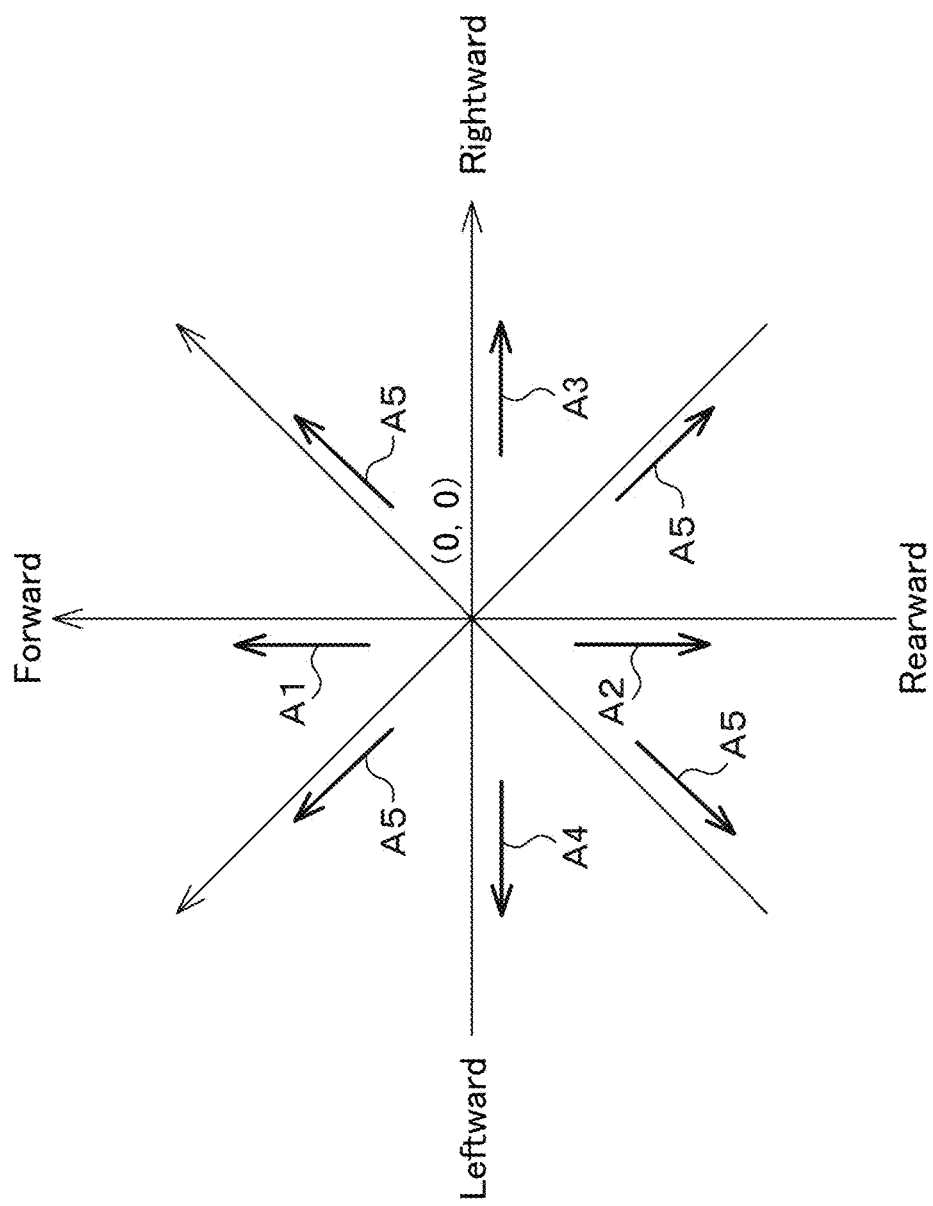
FIG. 2 is a diagram illustrating operation directions of a travel operation member according to the preferred embodiment.

FIG. 2 is a diagram illustrating operation directions of the travel operation member 59. When the travel operation member 59 is swung to the front (in a direction indicated by an arrow A1 in FIG. 1 and FIG. 2), the operation valve 55A is operated, and a pilot pressure is output from the operation valve 55A. The pilot pressure acts on the pressure receiver 53a of the left traveling pump 53L through the first travel fluid passage 45a and also acts on the pressure receiver 53a of the right traveling pump 53R through the third travel fluid passage 45c. Accordingly, the angles of the swash plates of the traveling pumps 53L and 53R are changed, and the traveling motors 36L and 36R are driven to rotate forward (forward rotation). As a result, the working machine 1 moves straight forward (forward traveling).

When the travel operation member 59 is swung to the rear (in a direction indicated by an arrow A2 in FIG. 1 and FIG. 2), the operation valve 55B is operated, and a pilot pressure is output from the operation valve 55B. The pilot pressure acts on the pressure receiver 53b of the left traveling pump 53L through the second travel fluid passage 45b and also acts on the pressure receiver 53b of the right traveling pump 53R through the fourth travel fluid passage 45d. Accordingly, the angles of the swash plates of the traveling pumps 53L and 53R are changed, and the traveling motors 36L and 36R are driven to rotate in reverse (rearward rotation). As a result, the working machine 1 moves straight rearward (rearward traveling).

When the travel operation member 59 is swung to the right (in a direction indicated by an arrow A3 in FIG. 1 and FIG. 2), the operation valve 55C is operated, and a pilot pressure is output from the operation valve 55C. The pilot pressure acts on the pressure receiver 53a of the left traveling pump 53L through the first travel fluid passage 45a and also acts on the pressure receiver 53b of the right traveling pump 53R through the fourth travel fluid passage 45d. Accordingly, the angles of the swash plates of the traveling pumps 53L and 53R are changed, the left traveling motor 36L is driven to rotate forward, and the right traveling motor 36R is driven to rotate in reverse. As a result, the working machine 1 spin turns to the right.

When the travel operation member 59 is swung to the left (in a direction indicated by an arrow A4 in FIG. 1 and FIG. 2), the operation valve 55D is operated, and a pilot pressure is output from the operation valve 55D. The pilot pressure acts on the pressure receiver 53a of the right traveling pump 53R through the third travel fluid passage 45c and also acts on the pressure receiver 53b of the left traveling pump 53L through the second travel fluid passage 45b. Accordingly, the angles of the swash plates of the traveling pumps 53L and 53R are changed, the left traveling motor 36L is driven to rotate in reverse, and the right traveling motor 36R is driven to rotate forward. As a result, the working machine 1 spin turns to the left.

The travel operation member 59 is also swingable in any one of a right forward diagonal direction, a left forward diagonal direction, a right rearward diagonal direction, and a left rearward diagonal direction. When the travel operation member 59 is swung in a diagonal direction (in any of directions indicated by arrows A5 in FIG. 2), the rotation directions and rotational speeds of the traveling motors 36L and 36R are determined by the pressure difference between the pilot pressure acting on the pressure receiver 53a and the pilot pressure acting on the pressure receiver 53b, and the working machine 1 pivot turns to the right or left while moving straight forward or rearward.

Specifically, when the travel operation member 59 is swung diagonally forward to the left, the working machine 1 pivot turns to the left while moving straight forward at a speed corresponding to the swing angle of the travel operation member 59. When the travel operation member 59 is swung diagonally forward to the right, the working machine 1 pivot turns to the right while moving straight forward at a speed corresponding to the swing angle of the travel operation member 59. When the travel operation member 59 is swung diagonally rearward to the left, the working machine 1 pivot turns to the left while moving straight rearward at a speed corresponding to the swing angle of the travel operation member 59. When the travel operation member 59 is swung diagonally rearward to the right, the working machine 1 pivot turns to the right while moving straight rearward at a speed corresponding to the swing angle of the travel operation member 59.

Second pressure detectors 83a to 83d are connected to the travel fluid passages 45a to 45d, respectively. More specifically, the second pressure detector 83a is connected to the first travel fluid passage 45a to supply the hydraulic fluid from the forward-movement operation valve 55A or the right-turning operation valve 55C to the pressure receiver 53a of the left traveling pump 53L. The second pressure detector 83a detects a first operation pressure, which is the pressure of the pilot fluid flowing through the first travel fluid passage 45a. The second pressure detector 83c is connected to the third travel fluid passage 45c to supply the hydraulic fluid from the forward-movement operation valve 55A or the left-turning operation valve 55D to the pressure receiver 53a of the right traveling pump 53R. The second pressure detector 83c detects a third operation pressure, which is the pressure of the pilot fluid flowing through the third travel fluid passage 45c.

The second pressure detector 83d is connected to the fourth travel fluid passage 45d to supply the hydraulic fluid from the rearward-movement operation valve 55B or the right-turning operation valve 55C to the pressure receiver 53b of the right traveling pump 53R. The second pressure detector 83d detects a fourth operation pressure, which is the pressure of the pilot fluid flowing through the fourth travel fluid passage 45d. The second pressure detector 83b is connected to the second travel fluid passage 45b to supply the hydraulic fluid from the rearward-movement operation valve 55B or the left-turning operation valve 55D to the pressure receiver 53b of the left traveling pump 53L. The second pressure detector 83b detects a second operation pressure, which is the pressure of the pilot fluid flowing through the second travel fluid passage 45b.

The travel fluid passages 45a to 45d are provided with throttle portions 84a to 84d downstream of the second pressure detectors 83a to 83d, respectively. More specifically, the throttle portion 84a is disposed in the first travel fluid passage 45a downstream of the connection point of the second pressure detector 83a (i.e., is disposed adjacent to the left traveling pump 53L). The throttle portion 84b is disposed in the second travel fluid passage 45b downstream of the connection point of the second pressure detector 83b (i.e., is disposed adjacent to the left traveling pump 53L). The throttle portion 84c is disposed in the third travel fluid passage 45c downstream of the connection point of the second pressure detector 83c (i.e., is disposed adjacent to the right traveling pump 53R). The throttle portion 84d is disposed in the fourth travel fluid passage 45*d* downstream of the connection point of the second pressure detector 83*d* (i.e., is disposed adjacent to the right traveling pump 53R). In other words, the second pressure detectors 83*a* to 83*d* are located upstream of the throttle portions 84*a* to 84*d* (i.e., are located adjacent to the operation valves 55A to 55D), respectively.

As illustrated in FIG. 1, the working machine 1 includes the controller 60. The controller 60 is implemented by semiconductor devices such as a central processing unit (CPU), a microprocessor unit (MPU), and a memory, and electric and electronic circuits, for example. The controller 60 is an electronic control unit (ECU) that performs various types of control of the working machine 1. The controller 60 is connected to an accelerator member 65, a mode switch 66, a speed selector switch 67, and rotational speed detectors 68*a*, 68*b*, and 68*c*. Operation members, such as the accelerator member 65, the mode switch 66, the speed selector switch 67, and the travel operation member 59 described above, are installed at positions so as to be operable by a driver (operator) seated on the operator's seat 8.

The accelerator member 65 is a lever, pedal, dial, or slidable operation member and is operated to set a target rotational speed of the prime mover 32. The mode switch 66 is a switch for enabling or disabling automatic shift-down for automatically shifting down the speed stage for the rotational speeds of the traveling motors 36L and 36R from the second speed stage to the first speed stage. When the mode switch 66 is turned on, the automatic shift-down is enabled by the controller 60. When the mode switch 66 is turned off, the automatic shift-down is disabled by the controller 60.

The speed selector switch 67 is usable to manually switch the speed stage for the rotational speeds of the traveling motors 36L and 36R to either the first speed stage or the second speed stage. The speed selector switch 67 is a seesaw switch, for example. The speed selector switch 67 can perform shift-up operation to shift up the speed stage for the rotational speeds of the traveling motors 36L and 36R from the first speed stage to the second speed stage and shift-down operation to shift down the speed stage for the rotational speeds of the traveling motors 36L and 36R from the second speed stage to the first speed stage.

Each of the rotational speed detectors 68*a*, 68*b*, and 68*c* is a sensor or the like that detects a rotational speed. The rotational speed detectors 68*a* and 68*b* (hereinafter referred to as the first rotational speed detectors 68*a* and 68*b*) detect the actual rotational speeds of the traveling motors 36L and 36R, respectively. More specifically, the first rotational speed detector 68*a* detects the actual rotational speed of the left traveling motor 36L at intervals of a predetermined period. The first rotational speed detector 68*b* detects the actual rotational speed of the right traveling motor 36R at intervals of the predetermined period.

The controller 60 stores the rotational speeds of the traveling motors 36L and 36R detected at intervals of the predetermined period by the first rotational speed detectors 68*a* and 68*b*, respectively, in a buffer disposed in the CPU. As a result, a predetermined number of (two or more) values can be held for each of the rotational speeds of the traveling motors 36L and 36R.

FIG. 3A is a diagram illustrating data DL of the rotational speed of the left traveling motor 36L, which can be held by the controller 60. FIG. 3B is a diagram illustrating data DR of the rotational speed of the right traveling motor 36R, which can be held by the controller 60. The first rotational speed detectors 68*a* and 68*b* detect the rotational speeds of the traveling motors 36L and 36R at intervals of a predetermined period T1 (50 msec in the example illustrated in FIGS. 3A and 3B) and input the data DL indicating the rotational speeds of the traveling motor 36L and the data DR indicating the rotational speeds of the traveling motor 36R to the controller 60 at intervals of the predetermined period T1.

As illustrated in FIG. 3A, the buffer of the controller 60 is capable of storing a predetermined number of (two or more) pieces (in the example illustrated in FIG. 3A, ten pieces) of data DL indicating values of the rotational speed of the left traveling motor 36L in the order from newest to oldest (in the order of DL(n), DL(n−1), . . . , and DL(n−9)). As illustrated in FIG. 3B, the buffer of the controller 60 is capable of storing a predetermined number of (two or more) pieces (in the example illustrated in FIG. 3B, ten pieces) of data DR indicating values of the rotational speed of the right traveling motor 36R in the order from newest to oldest (in the order of DR(n), DR(n−1), . . . , and DR(n−9)). That is, the controller 60 is capable of separately holding a plurality of values of the rotational speed of the left traveling motor 36L and a plurality of values of the rotational speed of the right traveling motor 36R in the buffer.

When the first rotational speed detector 68*a* detects a new value of the rotational speed of the left traveling motor 36L and inputs data DL (new) indicating the new value of the rotational speed to the controller 60, as illustrated in FIG. 3A, the controller 60 overwrites the data DL(n−9) indicating the oldest value of the rotational speed among the pieces of data DL(n), DL(n−1), . . . , and DL(n−9) indicating the plurality of values of the rotational speed of the left traveling motor 36L stored in the buffer with the data DL (new) indicating the new value of the rotational speed of the left traveling motor 36L. When the first rotational speed detector 68*b* detects a new value of the rotational speed of the right traveling motor 36R and inputs data DR (new) indicating the new value of the rotational speed to the controller 60, as illustrated in FIG. 3B, the controller 60 overwrites the data DR(n−9) indicating the oldest value of the rotational speed among the pieces of data DR(n), DR(n−1), . . . , and DR(n−9) indicating the plurality of values of the rotational speed of the right traveling motor 36R stored in the buffer with the data DR (new) indicating the new value of the rotational speed of the right traveling motor 36R.

That is, when new values of the rotational speeds of the traveling motors 36L and 36R are detected by the first rotational speed detectors 68*a* and 68*b*, respectively, the controller 60 holds the new values of the rotational speeds of the traveling motors 36L and 36R in the buffer, in place of the oldest ones among the plurality of values of the rotational speeds of the traveling motors 36L and 36R held in the buffer.

If one of the rotational speed of the traveling motors 36L and 36R when driven to rotate forward and the rotational speed of the traveling motors 36L and 36R when driven to rotate in reverse is set to a positive value (plus (+) value) and the other rotational speed is set to a negative value (minus (−) value), the controller 60 holds the absolute values of the rotational speeds in the buffer.

Further, the controller 60 calculates, based on the data indicating the plurality of values of the rotational speed of the left traveling motor 36L held (stored) in the buffer, an average of the plurality of values of the rotational speed and stores data indicating the average in the buffer. Further, the controller 60 calculates, based on the data indicating the plurality of values of the rotational speed of the right traveling motor 36R held in the buffer, an average of the plurality of values of the rotational speed and stores data indicating the average in the buffer.

The buffer is also capable of storing a predetermined number of (two or more) pieces of data (in the illustrated example, ten pieces of data) indicating averages for each of the rotational speeds of the traveling motors 36L and 36R. Accordingly, in response to calculation of a new average of the rotational speed of the left traveling motor 36L, the controller 60 overwrites the data indicating the oldest average of the rotational speed among the pieces of data indicating the plurality of averages of the rotational speed of the left traveling motor 36L held in the buffer with the data indicating the new average of the rotational speed of the left traveling motor 36L. In response to calculation of a new average of the rotational speed of the right traveling motor 36R, the controller 60 overwrites the data indicating the oldest average of the rotational speed among the pieces of data indicating the plurality of averages of the rotational speed of the right traveling motor 36R held in the buffer with the data indicating the new average of the rotational speed of the right traveling motor 36R.

That is, in response to calculation of respective averages of the rotational speeds of the traveling motors 36L and 36R held in the buffer, the controller 60 holds new averages of the rotational speeds of the traveling motors 36L and 36R in place of the respective oldest averages among the plurality of averages of the rotational speeds of the traveling motors 36L and 36R held in the buffer.

The rotational speed detector 68c (hereinafter referred to as the second rotational speed detector 68c) (FIG. 1) detects the actual rotational speed of the prime mover 32 at intervals of a predetermined period. The controller 60 controls the driving of the prime mover 32 so that the actual rotational speed of the prime mover 32 detected by the second rotational speed detector 68c matches the target rotational speed set by the accelerator member 65.

The controller 60 includes an automatic shift-down unit 61. The automatic shift-down unit 61 is implemented by, for example, electric and electronic circuits disposed in the controller 60 or a software program stored in the controller 60, for example. When the working machine 1 is in a traveling mode in which the working machine 1 travels by using the traveling devices 5R and 5L and the automatic shift-down is enabled, the automatic shift-down unit 61 performs automatic shift-down control. When the working machine 1 is in the traveling mode and the automatic shift-down is disabled, the automatic shift-down unit 61 does not perform the automatic shift-down control (the automatic shift-down control is stopped). Also when the working machine 1 is in an acquisition mode described below, the automatic shift-down unit 61 does not perform the automatic shift-down control.

In the automatic shift-down control, if a predetermined automatic shift-down condition is satisfied when the rotational speeds of the traveling motors 36L and 36R are in the second speed stage, the controller 60 automatically shifts down (switches) the speed stage for the rotational speeds of the traveling motors 36L and 36R from the second speed stage to the first speed stage. Specifically, the controller 60 deenergizes the solenoid in the second switching valve 72 and switches the second switching valve 72 from the second position 72b to the first position 72a so as to shift down the speed stage from the second stage to the first stage to thereby reduce the rotational speeds of the traveling motors 36L and 36R. That is, to perform automatic shift-down, the controller 60 shifts down the speed stage for the rotational speeds of both the left traveling motor 36L and the right traveling motor 36R from the second speed stage to the first speed stage.

As described above, if a predetermined return condition is satisfied after the automatic shift-down of the speed stage for the rotational speeds of the traveling motors 36L and 36R is performed, the automatic shift-down unit 61 energizes the solenoid in the second switching valve 72 and switches the second switching valve 72 from the first position 72a to the second position 72b to shift up the speed stage from the first speed stage to the second speed stage to thereby increase (return) the rotational speeds of the traveling motors 36L and 36R. That is, the rotational speeds of the traveling motors 36L and 36R are returned to those in the high-speed second speed stage. In other words, to return the rotational speeds of the traveling motors 36L and 36R to those in the second speed stage, the speed stage for the rotational speeds of both the left traveling motor 36L and the right traveling motor 36R is shifted up from the first speed stage to the second speed stage.

The return condition described above may be, for example, at least one of the following conditions: a condition in which the rotational speeds of the traveling motors 36L and 36R have an acceleration tendency corresponding to an increase in the travel speed of the working machine 1, a condition in which the rotational speeds of the traveling motors 36L and 36R have the acceleration tendency and the amounts of change in the rotational speeds are each greater than or equal to a predetermined value, and a condition in which the travel pressures LF, LB, RF, and RB or effective travel pressures a to d (see Expression (5) below) calculated based on the travel pressures LF, LB, RF, and RB are each less than or equal to a return threshold.

That is, the return threshold may be set based on the tendency or degree of change in physical quantity that changes in accordance with the traveling state of the working machine 1, such as the rotational speeds of the traveling motors 36L and 36R and the travel pressures LF, LB, RF, and RB. The physical quantity is detectable using a rotational speed detector, a pressure detector, an angle sensor, a flow rate detector, a speed sensor, an acceleration sensor, a Global Positioning System (GPS) sensor, or the like. Further, the return threshold is set to a value smaller than a shift-down threshold.

When the automatic shift-down is disabled, the controller 60 performs manual switching control to switch the speed stage for the rotational speeds of the traveling motors 36L and 36R to either the first speed stage or the second speed stage in accordance with the operation of the speed selector switch 67.

Specifically, in response to a shift-down operation of the speed selector switch 67, the controller 60 deenergizes the solenoid in the second switching valve 72 and switches the second switching valve 72 from the second position 72b to the first position 72a to shift down the speed stage for the rotational speeds of the traveling motors 36L and 36R from the second speed stage to the first speed stage. In response to a shift-up operation of the speed selector switch 67, the controller 60 energizes the solenoid in the second switching valve 72 and switches the second switching valve 72 from the first position 72a to the second position 72b to shift up the speed stage for the rotational speeds of the traveling motors 36L and 36R from the first speed stage to the second speed stage. The controller 60 may switch the speed stage for the rotational speeds of the traveling motors 36L and 36R to either the first speed stage or the second speed stage in accordance with the operation of the speed selector switch 67, regardless of whether the automatic shift-down is enabled or disabled.

The controller 60 is connected to a measurement device 69. The measurement device 69 is a pressure sensor or the like. The measurement device 69 measures travel relief pressures w1 to w4, which are pressures of the hydraulic fluid acting on the relief valves 81a to 81d, respectively. The travel relief pressures w1 to w4 are, for example, the pressures of the hydraulic fluid acting on the relief valves 81a to 81d when the relief valves 81a to 81d start to be activated, or the pressures of the hydraulic fluid acting on the circulation fluid passages 57h and 57i when the pressures of the hydraulic fluid are stabilized after the relief valves 81a to 81d are activated.

For example, when a predetermined operation is performed on the working machine 1, the controller 60 enters the acquisition mode to acquire effective relief pressures u1 to u4 of the relief valves 81a to 81d. At this time, the predetermined operation includes an operation of selecting the acquisition mode, and an operation of causing the travel operation member 59 to maximally swing forward or rearward to make the relief pressure act on the relief valves 81a to 81d.

In the acquisition mode, the controller 60 changes the rotational speed of the prime mover 32 a predetermined number of times, causes the measurement device 69 to measure the travel relief pressures w1 to w4 acting on the relief valves 81a to 81d at each value of the rotational speed, and causes the first pressure detectors 80a to 80d to detect the travel pressures LF, LB, RF, and RB acting on the circulation fluid passages 57h and 57i to acquire the effective relief pressures u1 to u4 in accordance with the travel relief pressures w1 to w4 and the travel pressures LF, LB, RF, and RB.

More specifically, the controller 60 controls the driving of the prime mover 32. When the actual rotational speed of the prime mover 32 detected by the second rotational speed detector 68c reaches a predetermined rotational speed (a predetermined value greater than 0), the controller 60 causes the measurement device 69 to measure the first travel relief pressure w1 acting on the first relief valve 81a fluidly connected to the first port 82a of the left traveling pump 53L, and causes the first pressure detector 80b to detect, at the time of measurement, the second travel pressure LB acting on the second port P12 of the left traveling motor 36L. Further, the controller 60 causes the measurement device 69 to measure the second travel relief pressure w2 acting on the second relief valve 81b fluidly connected to the second port 82b of the left traveling pump 53L, and causes the first pressure detector 80a to detect, at the time of measurement, the first travel pressure LF acting on the first port P11 of the left traveling motor 36L.

Further, the controller 60 causes the measurement device 69 to measure the third travel relief pressure w3 acting on the third relief valve 81c fluidly connected to the third port 82c of the right traveling pump 53R, and causes the first pressure detector 80d to detect, at the time of measurement, the fourth travel pressure RB acting on the fourth port P14 of the right traveling motor 36R. Further, the controller 60 causes the measurement device 69 to measure the fourth travel relief pressure w4 acting on the fourth relief valve 81d fluidly connected to the fourth port 82d of the right traveling pump 53R, and causes the first pressure detector 80c to detect, at the time of measurement, the third travel pressure RF acting on the third port P13 of the right traveling motor 36R.

Then, the controller 60 calculates the effective relief pressures u1 to u4, based on the travel relief pressures w1 to w4 and the travel pressures LF, LB, RF, and RB, which are measured or detected in the way described above, in accordance with Expression (1) below.

$$\begin{pmatrix} u3(rpm) \\ u1(rpm) \\ u4(rpm) \\ u2(rpm) \end{pmatrix} = \begin{pmatrix} w3(rpm) - RB \ (t, rpm) \text{ at measurement of } w3 \\ w1(rpm) - LB \ (t, rpm) \text{ at measurement of } w1 \\ w4(rpm) - RF \ (t, rpm) \text{ at measurement of } w4 \\ w2(rpm) - LF \ (t, rpm) \text{ at measurement of } w2 \end{pmatrix} \quad (1)$$

As given in Expression (1), the controller 60 subtracts the second travel pressure LB obtained at the time of measurement of the first travel relief pressure w1 from the first travel relief pressure w1 to determine the first effective relief pressure u1. Further, the controller 60 subtracts the first travel pressure LF obtained at the time of measurement of the second travel relief pressure w2 from the second travel relief pressure w2 to determine the second effective relief pressure u2. Further, the controller 60 subtracts the fourth travel pressure RB obtained at the time of measurement of the third travel relief pressure w3 from the third travel relief pressure w3 to determine the third effective relief pressure u3. Further, the controller 60 subtracts the third travel pressure RF obtained at the time of measurement of the fourth travel relief pressure w4 from the fourth travel relief pressure w4 to determine the fourth effective relief pressure u4.

In Expression (1), "(rpm)" after the travel relief pressures w1 to w4 and the effective relief pressures u1 to u4 is not the unit of the travel relief pressures w1 to w4 and the effective relief pressures u1 to u4 (pressure is expressed in MPa), but a variable of the travel relief pressures w1 to w4 and the effective relief pressures u1 to u4 that corresponds to a change in the rotational speed of the traveling motors 36L and 36R or the prime mover 32 (rotational speed is expressed in rpm). Further, "(t, rpm)" after the travel pressures LF, LB, RF, and RB is not the unit of the travel pressures LF, LB, RF, and RB, but a variable of the travel pressures LF, LB, RF, and RB that corresponds to a change in time [t] and in the rotational speed of the traveling motors 36L and 36R or the prime mover 32 (rotational speed is expressed in rpm). The same applies to "(rpm)" and "(t, rpm)" after coefficients, thresholds, and pressures given in Expressions (2) to (6) below.

Upon acquisition of the effective relief pressures u1 to u4, the controller 60 stores the effective relief pressures u1 to u4 in a memory (such as a non-volatile memory; hereinafter referred to as an "internal memory") included in the controller 60 in association with a predetermined rotational speed of the prime mover 32.

After repeatedly executing the operation of acquiring the effective relief pressures u1 to u4 corresponding to the rotational speed of the prime mover 32 as described above a predetermined number of times, the controller 60 derives control data representing a correlation between the rotational speed of the prime mover 32 and the effective relief pressures u1 to u4 on the basis of the content stored in the internal memory.

FIG. 4 is a graph illustrating an example of a correlation between the rotational speed of the prime mover 32 and the effective relief pressures u1 to u4. For example, upon deriving control data L1 representing a correlation between the rotational speed of the prime mover 32 and the effective relief pressures u1 to u4 as illustrated in FIG. 4, the controller 60 stores the control data L1 in the internal memory and then exits the acquisition mode. In the control data L1, as the rotational speed of the prime mover 32 increases, the effective relief pressures u1 to u4 increase. The correlation between the rotational speed of the prime mover 32 and the effective relief pressures u1 to u4 is not limited to the control data L1 as illustrated in FIG. 4.

Figure 5B:
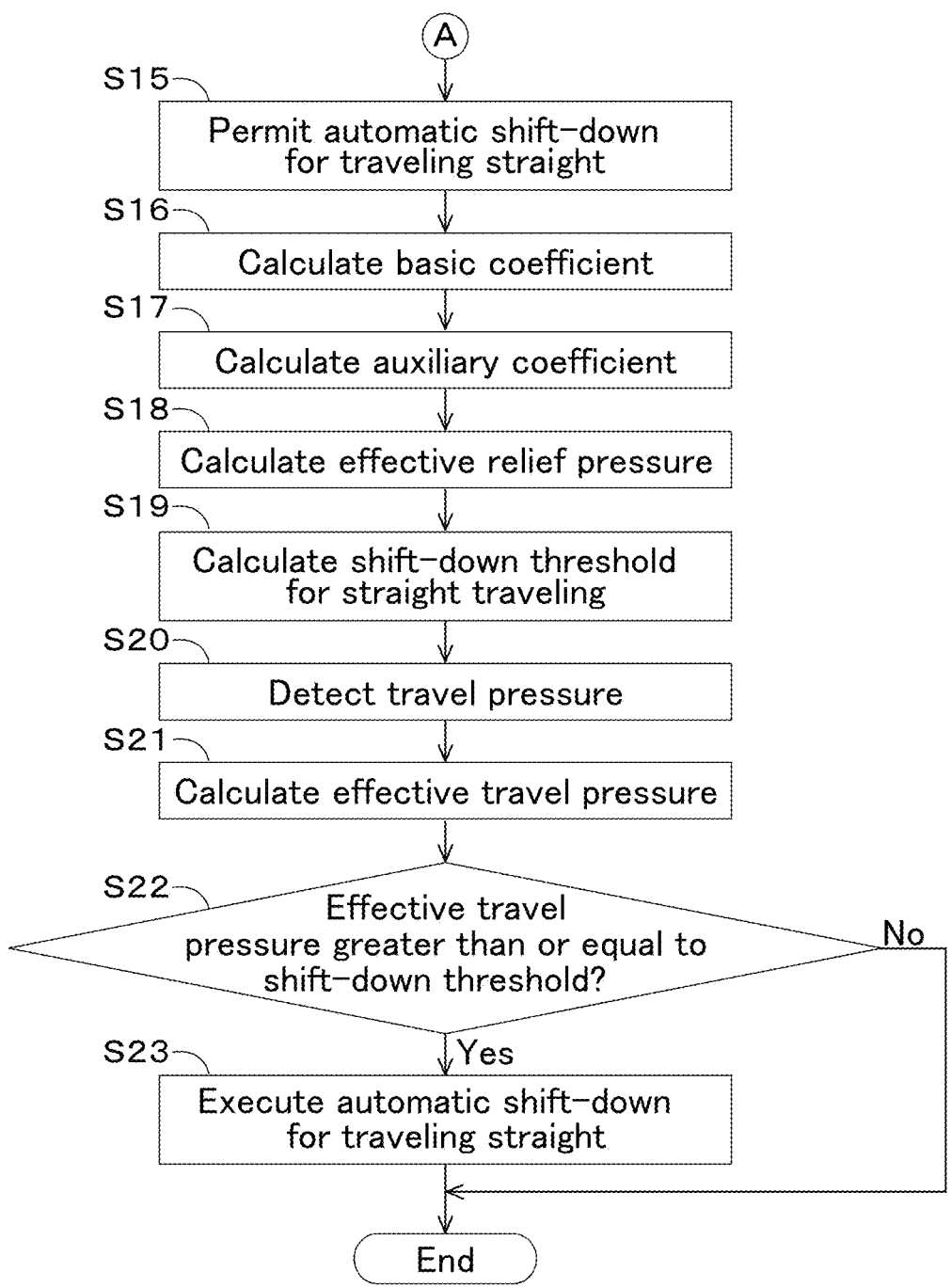
FIG. 5B is a flowchart illustrating the automatic shift-down determination process for straight traveling according to the first preferred embodiment.

FIGS. 5A and 5B are a flowchart illustrating an automatic shift-down determination process for straight traveling according to a first preferred embodiment. The automatic shift-down determination process is repeatedly executed at intervals of a predetermined period by the controller 60 when the working machine 1 is in a normal mode.

For example, the controller 60 confirms, based on the rotation directions and rotational speeds of the traveling motors 36L and 36R detected by the first rotational speed detectors 68a and 68b, or the like, that the working machine 1 (the machine body 2 and the traveling devices 5L and 5R) is traveling straight forward or rearward (S1).

Further, the controller 60 confirms, based on the switching position of the travel switching valve 34 (the second switching valve 72), the rotational speeds of the traveling motors 36L and 36 detected by the first rotational speed detectors 68a and 68b, or the like, that the rotational speeds of the traveling motors 36L and 36 are in the second speed stage (S2).

Further, the controller 60 confirms, based on the operating state of the mode switch 66, that the automatic shift-down is enabled (S3).

Then, the controller 60 determines the operating state of the travel operation member 59, based on the first to fourth operation pressures of the first to fourth travel fluid passages 45a to 45d detected by the second pressure detectors 83a to 83d (S4). For example, if any one of the first to fourth operation pressures of the first to fourth travel fluid passages 45a to 45d detected by the second pressure detectors 83a to 83d is less than a predetermined value, the controller 60 determines that the travel operation member 59 is in a neutral state.

If the first operation pressure of the first travel fluid passage 45a and the third operation pressure of the third travel fluid passage 45c are greater than or equal to the predetermined value and are higher than the second operation pressure of the second travel fluid passage 45b and the fourth operation pressure of the fourth travel fluid passage 45d, the controller 60 determines that the travel operation member 59 is swung to the front (forward movement operation). If the second operation pressure of the second travel fluid passage 45b and the fourth operation pressure of the fourth travel fluid passage 45d are greater than or equal to the predetermined value and are higher than the first operation pressure of the first travel fluid passage 45a and the third operation pressure of the third travel fluid passage 45c, the controller 60 determines that the travel operation member 59 is swung to the rear (rearward movement operation).

If the first operation pressure of the first travel fluid passage 45a and the fourth operation pressure of the fourth travel fluid passage 45d are greater than or equal to the predetermined value and are higher than the second operation pressure of the second travel fluid passage 45b and the third operation pressure of the third travel fluid passage 45c, the controller 60 determines that the travel operation member 59 is swung to the right (right-turning operation). If the second operation pressure of the second travel fluid passage 45b and the third operation pressure of the third travel fluid passage 45c are greater than or equal to the predetermined value and are higher than the first operation pressure of the first travel fluid passage 45a and the fourth operation pressure of the fourth travel fluid passage 45d, the controller 60 determines that the travel operation member 59 is swung to the left (left-turning operation).

The method for determining the operating state of the travel operation member 59 described above is an example, and the present invention is not limited thereto.

If it is determined that the travel operation member 59 in the neutral state or it is determined that the travel operation member 59 is swung to the left or right (S5: No), the controller 60 prohibits the automatic shift-down (S6) and ends the automatic shift-down determination process. For example, the controller 60 turns on an automatic shift-down prohibition flag set in a predetermined area of the internal memory to prohibit the automatic shift-down. As a result, automatic shift-down during straight traveling of the working machine 1 is not executed. After some time, the controller 60 re-starts the automatic shift-down determination process.

If it is determined that the travel operation member 59 is swung to the front or rear (S5: Yes), the controller 60 checks whether the direction of the swinging operation is opposite to the straight traveling direction of the working machine 1. If the operation direction (forward or rearward) of the travel operation member 59 is opposite to the straight traveling direction of the working machine 1 (S7: Yes), the controller 60 prohibits the automatic shift-down (S6), and then ends the automatic shift-down determination process.

If the operation direction of the travel operation member 59 is forward or rearward (S5: Yes) and is not opposite to the straight traveling direction of the working machine 1 (S7: No), the controller 60 calculates the respective amounts of change in the rotational speeds of the traveling motors 36L and 36R (S8). At this time, for example, the controller 60 calculates the difference between the latest average and the oldest average (=latest average−oldest average) among the plurality of averages of the rotational speed of the left traveling motor 36L held in the buffer as the amount of change in the rotational speed of the left traveling motor 36L. Further, the controller 60 calculates the difference between the latest average and the oldest average (=latest average−oldest average) among the plurality of averages of the rotational speed of the right traveling motor 36R held in the buffer as the amount of change in the rotational speed of the right traveling motor 36R.

In another example, the controller 60 may calculate the difference between the latest value of the rotational speed and the oldest value of the rotational speed (=latest value of rotational speed−oldest value of rotational speed) among the plurality of values of the rotational speed of the left traveling motor 36L held in the buffer as the amount of change in the rotational speed of the left traveling motor 36L. The controller 60 may further calculate the amount of change in the rotational speed of the right traveling motor 36R in a way similar to that for the amount of change in the rotational speed of the left traveling motor 36L.

In another example, the controller 60 may calculate an average of values excluding the maximum value and the minimum value among the plurality of values of the rotational speed of the left traveling motor 36L held in the buffer as the amount of change in the rotational speed of the left traveling motor 36L, or may calculate the difference between the latest value of the rotational speed and the oldest value of the rotational speed among the other values of the rotational speed as the amount of change in the rotational speed of the left traveling motor 36L. The controller 60 may further calculate the amount of change in the rotational speed of the right traveling motor 36R in a way similar to that for the amount of change in the rotational speed of the left traveling motor 36L.

Immediately after the travel operation member 59 is swung to the front or rear from the neutral state, the rotational speeds of the traveling motors 36L and 36R may be temporarily decreased, or the first to fourth travel pressures LF, LB, RF, and RB may be temporarily increased. To wait for the rotational speeds of the traveling motors 36L and 36R or the first to fourth travel pressures LF, LB, RF, and RB, which have been temporarily fluctuated, to be stabilized, the controller 60 sets a standby time based on the amounts of change in the rotational speeds of the traveling motors 36L and 36R (S9). The standby time is set to a time of 0 seconds or longer.

Figure 6:
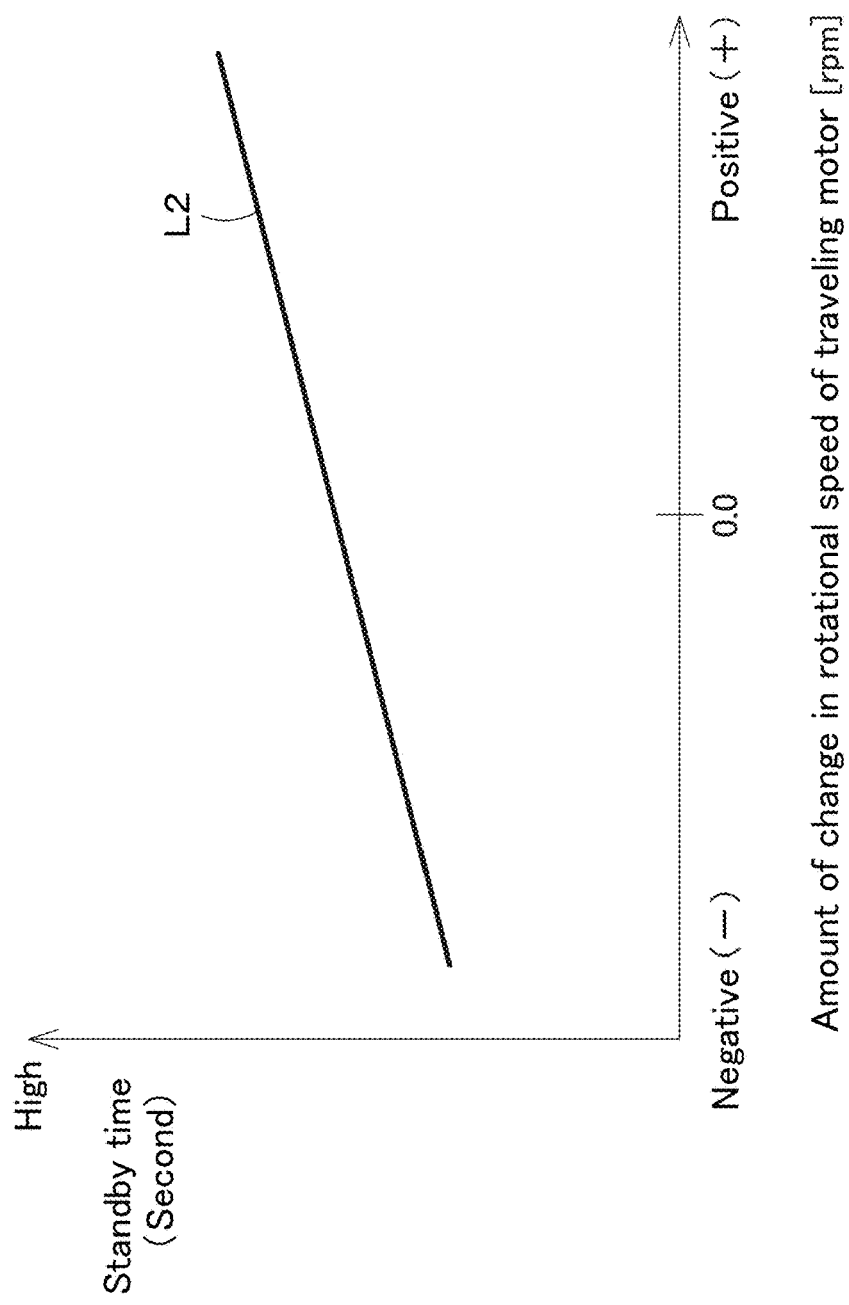
FIG. 6 is a graph illustrating an example of a correlation between an amount of change in the rotational speed of a traveling motor and a standby time according to the preferred embodiment.

FIG. 6 is a graph illustrating an example of a correlation between the amount of change in the rotational speeds of the traveling motors 36L and 36R and the standby time. Control data L2 illustrated in FIG. 6, which represents the correlation between the amount of change in the rotational speeds of the traveling motors 36L and 36R and the standby time, is acquired in advance by design, experiment, simulation, or the like, and is stored in the internal memory of the controller 60. In the control data L2, the standby time increases as the amount of change in the rotational speeds of the traveling motors 36L and 36R increases.

More specifically, in the control data L2, when the amount of change in the rotational speeds of the traveling motors 36L and 36R is a positive value, the standby time increases as the absolute value of the amount of change increases; when the amount of change in the rotational speeds of the traveling motors 36L and 36R is a negative value, the standby time decreases as the absolute value of the amount of change increases.

For example, based on the control data L2 illustrated in FIG. 6, the controller 60 determines the standby time corresponding to the amount of change in the rotational speed of the left traveling motor 36L, and determines the standby time corresponding to the amount of change in the rotational speed of the right traveling motor 36R. Then, the controller 60 adopts either the longer or shorter standby time of the determined two standby times. Alternatively, the controller 60 calculates an average of the standby time corresponding to the amount of change in the rotational speed of the left traveling motor 36L and the standby time corresponding to the amount of change in the rotational speed of the right traveling motor 36R, which are set based on the control data L2 illustrated in FIG. 6, and adopts the calculated average as the standby time. The correlation between the amount of change in the rotational speeds of the traveling motors 36L and 36R and the standby time is not limited to the control data L2 as illustrated in FIG. 6.

In another example, the controller 60 may set the standby time, based on the latest values (current values) of the rotational speeds of the traveling motors 36L and 36R held in the buffer. Alternatively, the controller 60 may set the standby time, based on the latest or maximum average among the averages of the rotational speeds of the traveling motors 36L and 36R held in the buffer.

Upon setting the standby time, the controller 60 performs clocking by using the internal memory (such as a volatile memory). When the standby time elapses (S10 in FIG. 5A), the controller 60 sets a determination reference value for determining the degree of change in the rotational speeds of the traveling motors 36L and 36R, based on the current rotational speed of the prime mover 32 detected by the second rotational speed detector 68c (S11). A rotational speed of 0 rpm or higher is set as the determination reference value.

Figure 7:
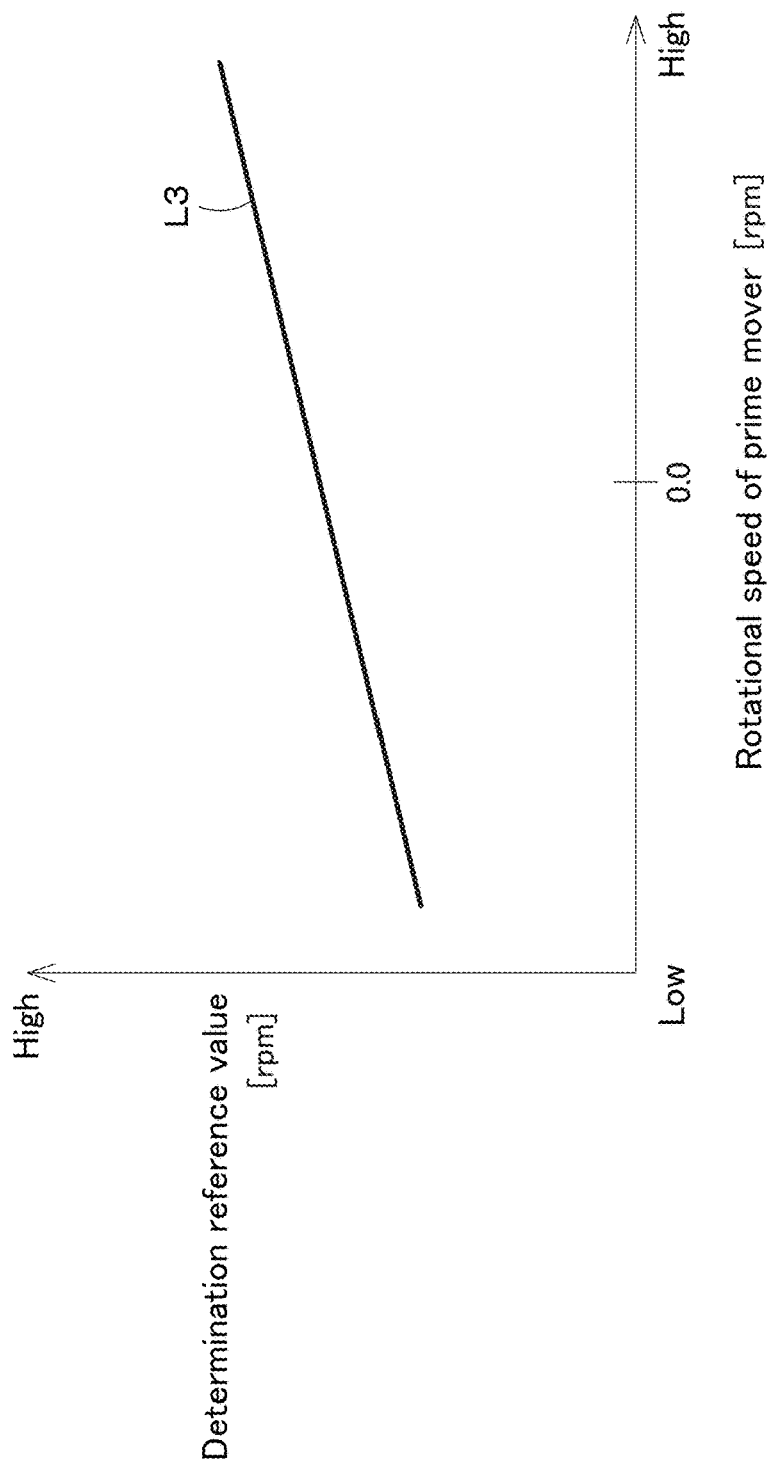
FIG. 7 is a graph illustrating an example of a correlation between a rotational speed of a prime mover and a determination reference value according to the preferred embodiment.

FIG. 7 is a graph illustrating an example of a correlation between the rotational speed of the prime mover 32 and the determination reference value. Control data L3 illustrated in FIG. 7, which represents the correlation between the rotational speed of the prime mover 32 and the determination reference value, is acquired in advance by design, experiment, simulation, or the like, and is stored in the internal memory of the controller 60. In the control data L3, as the rotational speed of the prime mover 32 increases, the determination reference value increases. The controller 60 sets, based on the control data L3 illustrated in FIG. 7, the determination reference value corresponding to the current rotational speed of the prime mover 32 detected by the second rotational speed detector 68c (S11 in FIG. 5A). The correlation between the rotational speed of the prime mover 32 and the determination reference value is not limited to the control data L3 as illustrated in FIG. 7.

The travel speed of the working machine 1 and the rotational speeds of the traveling motors 36L and 36R change not only with the rotational speed of the prime mover 32 but also with the first to fourth operation pressures, which are pilot pressures output from the travel operation device 54, and a travel load applied to the traveling devices 5L and 5R (the discharge flow rates of the hydraulic fluid from the first to fourth relief valves 81a to 81d). Accordingly, in another example, the controller 60 may set the determination reference value, based on the first to fourth operation pressures detected by the second pressure detectors 83a to 83d. Alternatively, the measurement device 69 may measure the first to fourth travel relief pressures w1 to w4 of the first to fourth relief valves 81a to 81d, and the controller 60 may calculate the discharge flow rates of the hydraulic fluid from the first to fourth relief valves 81a to 81d, based on the first to fourth travel relief pressures w1 to w4 and set the determination reference value based on the calculated discharge flow rates.

Upon setting the determination reference value, for example, the controller 60 compares the latest average among the averages of the rotational speed of the left traveling motor 36L held in the buffer with the determination reference value. Further, the controller 60 compares the latest average among the averages of the rotational speed of the right traveling motor 36R held in the buffer with the determination reference value. If at least one of the latest averages of the rotational speeds of the traveling motors 36L and 36R is greater than the determination reference value (S12: Yes in FIG. 5A), the controller 60 determines that the degree of change in the rotational speed of the traveling motor 36L or 36R corresponding to the average is high (S13), and prohibits the automatic shift-down control (S6). Then, the controller 60 ends the automatic shift-down determination process.

On the other hand, if both of the latest averages of the rotational speeds of the traveling motors 36L and 36R are less than or equal to the determination reference value (S12: No), the controller 60 determines that the degree of change in the rotational speeds of the traveling motors 36L and 36R is low (S14), and permits the automatic shift-down (S15 in FIG. 5B). At this time, for example, the controller 60 turns off the automatic shift-down prohibition flag.

In another example, the controller 60 may compare the amount of change in the rotational speed of each of the traveling motors 36L and 36R, which is the difference between the latest average and the oldest average among the plurality of averages of the rotational speed of the corresponding one of the traveling motors 36L and 36R held in the buffer, with the corresponding determination reference value, and determine whether the degree of change in the rotational speed of the corresponding one of the traveling motors 36L and 36R is large, based on the result of comparison between the amount of change and the determination reference value.

In still another example, the controller 60 may compare another amount of change in the rotational speed of each of the traveling motors 36L and 36R held in the buffer, such as the difference between the latest value and the oldest value of the rotational speed of the corresponding one of the traveling motors 36L and 36R, or the difference between the latest value and the oldest value of the rotational speed among other values excluding the maximum value and the minimum value of the rotational speed of the corresponding one of the traveling motors 36L and 36R, with the corresponding determination reference value, and determine whether the degree of change in the rotational speed of the corresponding one of the traveling motors 36L and 36R is large, based on the result of comparison between the amount of change and the determination reference value.

In still another example, the controller 60 may compare the latest value or any other value of the rotational speed of each of the traveling motors 36L and 36R held in the buffer with the corresponding determination reference value, and determine whether the degree of change in the rotational speed of the corresponding one of the traveling motors 36L and 36R is large, based on the result of comparison between the value and the determination reference value.

Then, the controller 60 sets, based on the current rotational speed of the prime mover 32 detected by the second rotational speed detector 68c, basic coefficients (first coefficients) η5a to η5d (S16). As given in Expression (2) below, the basic coefficients η5a to η5d include a first basic coefficient η5a, a second basic coefficient η5b, a third basic coefficient η5c, and a fourth basic coefficient η5d.

$$\begin{pmatrix} \eta 5a(rpm) \\ \eta 5b(rpm) \\ \eta 5c(rpm) \\ \eta 5d(rpm) \end{pmatrix} = \begin{pmatrix} \text{Basic coefficient for right forward movement} \\ \text{Basic coefficient for left forward movement} \\ \text{Basic coefficient for right rearward movement} \\ \text{Basic coefficient for left rearward movement} \end{pmatrix} \quad (2)$$

Figure 8:
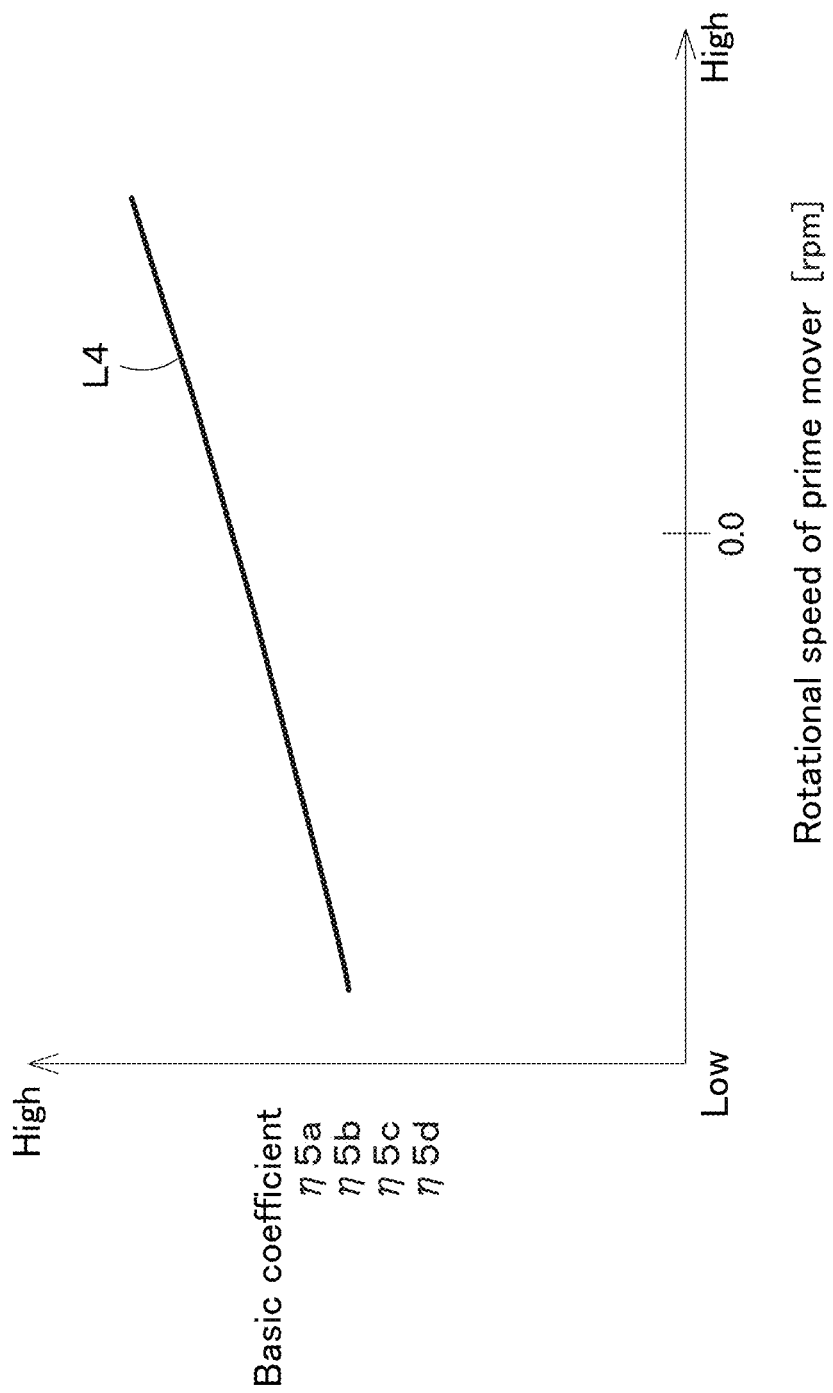
FIG. 8 is a graph illustrating an example of a correlation between the rotational speed of the prime mover and a basic correction coefficient according to the preferred embodiment.

FIG. 8 is a graph illustrating an example of a correlation between the rotational speed of the prime mover 32 and the basic coefficients η5a to η5d. Control data L4 illustrated in FIG. 8, which represents the correlation between the rotational speed of the prime mover 32 and the basic coefficients η5a to η5d, is acquired in advance by design, experiment, simulation, or the like, and is stored in the internal memory of the controller 60. In the control data L4, as the rotational speed of the prime mover 32 increases, the basic coefficients η5a to η5d increase. The basic coefficients η5a to η5d are each set to a numerical value greater than 0 and less than 1.

At the time of the forward rotation of the right traveling motor 36R (when the right traveling motor 36R is driven to rotate in the direction corresponding to the forward movement of the working machine 1), the controller 60 sets, based on the control data L4 illustrated in FIG. 8, the first basic coefficient η5a corresponding to the current rotational speed of the prime mover 32 detected by the second rotational speed detector 68c. At the time of the forward rotation of the left traveling motor 36L, the controller 60 sets the second basic coefficient η5b corresponding to the current rotational speed of the prime mover 32, based on the control data L4.

At the time of the reverse rotation of the right traveling motor 36R (when the right traveling motor 36R is driven to rotate in the direction corresponding to the rearward movement of the working machine 1), the controller 60 sets the third basic coefficient η5c corresponding to the current rotational speed of the prime mover 32, based on the control data L4. At the time of the reverse rotation of the left traveling motor 36L, the controller 60 sets the fourth basic coefficient η5d corresponding to the current rotational speed of the prime mover 32, based on the control data L4. The correlation between the rotational speed of the prime mover 32 and the basic coefficients η5a to η5d is not limited to the control data L4 as illustrated in FIG. 8.

Further, the controller 60 determines the tendency of change in the rotational speeds of the traveling motors 36L and 36R, based on the amount of change in the rotational speeds of the traveling motors 36L and 36R, and sets auxiliary coefficients (second coefficients) η6a to η6d (S17). At this time, for example, if the amount of change in the rotational speeds of the traveling motors 36L and 36R is a positive value (plus (+) value), the controller 60 determines that the rotational speeds of the traveling motors 36L and 36R tend to increase (or accelerate). If the amount of change in the rotational speeds of the traveling motors 36L and 36R is a negative value (minus (−) value), the controller 60 determines that the rotational speeds of the traveling motors 36L and 36R tend to decrease. If the amount of change in the rotational speeds of the traveling motors 36L and 36R is a zero value, the controller 60 determines that the rotational speeds of the traveling motors 36L and 36R are constant.

The controller 60 sets the auxiliary coefficients η6a to η6d, based on the tendency of change in the rotational speeds of the traveling motors 36L and 36R and the amount of change in the rotational speeds of the traveling motors 36L and 36R. As given in Expression (3) below, the auxiliary coefficients η6a to η6d include a first auxiliary coefficient η6a, a second auxiliary coefficient η6b, a third auxiliary coefficient η6c, and a fourth auxiliary coefficient η6 d.

$$\begin{pmatrix} \eta 6a(rpm) \\ \eta 6b(rpm) \\ \eta 6c(rpm) \\ \eta 6d(rpm) \end{pmatrix} = \begin{pmatrix} \text{Auxiliary coefficient for right forward movement} \\ \text{Auxiliary coefficient for left forward movement} \\ \text{Auxiliary coefficient for right rearward movement} \\ \text{Auxiliary coefficient for left rearward movement} \end{pmatrix} \quad (3)$$

Figure 9:
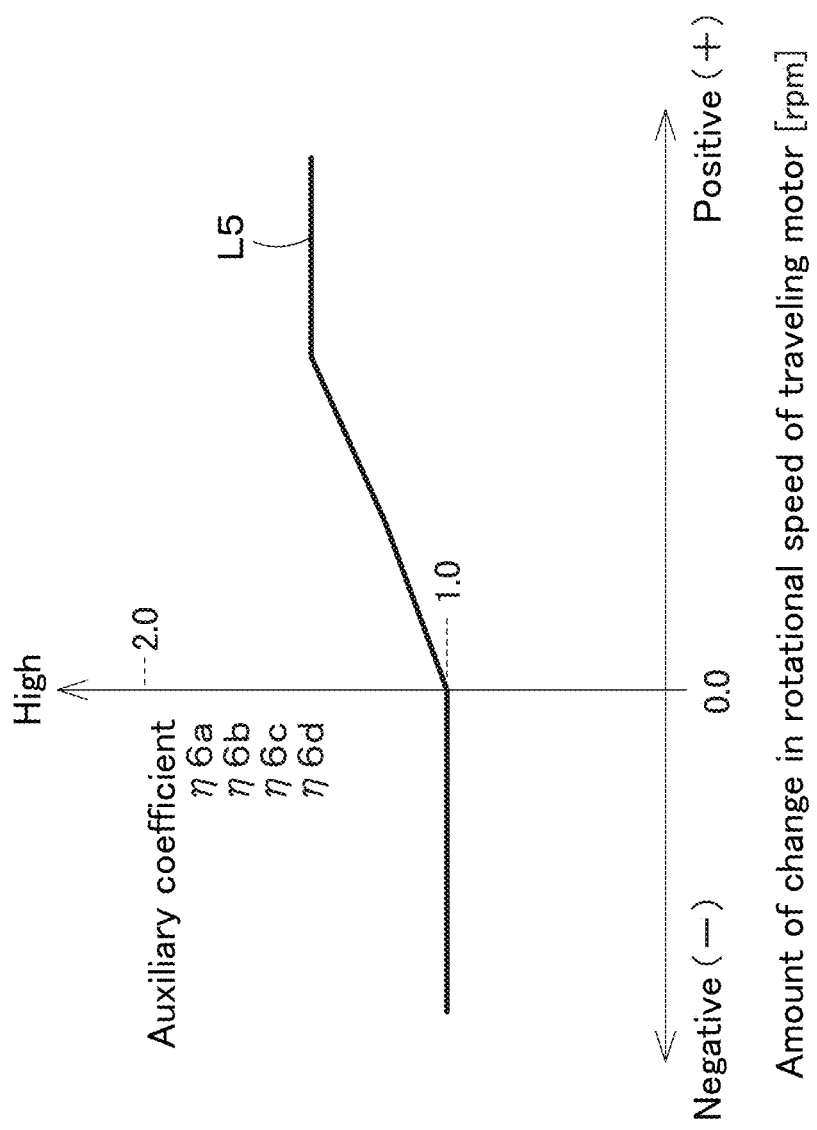
FIG. 9 is a graph illustrating an example of a correlation between the amount of change in the rotational speed of the traveling motor and an auxiliary correction coefficient according to the preferred embodiment.

FIG. 9 is a graph illustrating an example of a correlation between the amount of change in the rotational speeds of the traveling motors 36L and 36R and the auxiliary coefficients η6a to η6d. Control data L5 illustrated in FIG. 9, which represents the correlation between the amount of change in the rotational speeds of the traveling motors 36L and 36R and the auxiliary coefficients η6a to η6d, is acquired in advance by design, experiment, simulation, or the like, and is stored in the internal memory of the controller 60. In the control data L5, the auxiliary coefficients η6a to η6d are "1.0" when the amount of change in the rotational speed of each of the traveling motors 36L and 36R (=latest average−oldest average of rotational speed held in buffer) is a negative value (minus (−) value) less than or equal to 0 and the rotational speed of each of the traveling motors 36L and 36R tends to decrease or is in a constant-speed state.

In the control data L5, when the amount of change in the rotational speeds of the traveling motors 36L and 36R is a positive value (plus (+) value) greater than 0 and the rotational speeds of the traveling motors 36L and 36R tend to increase, the auxiliary coefficients η6a to η6d increase (η6a to η6d>1.0) as the amount of change in the rotational speeds of the traveling motors 36L and 36R increases.

At the time of the forward rotation of the right traveling motor 36R, the controller 60 sets, based on the control data L5, the first auxiliary coefficient η6a corresponding to the tendency of change in the rotational speeds of the traveling motors 36L and 36R and the amount of change in the rotational speeds of the traveling motors 36L and 36R. At the time of the forward rotation of the left traveling motor 36L, the controller 60 sets, based on the control data L5, the second auxiliary coefficient η6b corresponding to the tendency of change in the rotational speeds of the traveling motors 36L and 36R and the amount of change in the rotational speeds of the traveling motors 36L and 36R.

At the time of the reverse rotation of the right traveling motor 36R, the controller 60 sets, based on the control data L5, the third auxiliary coefficient η6c corresponding to the tendency of change in the rotational speeds of the traveling motors 36L and 36R and the amount of change in the rotational speeds of the traveling motors 36L and 36R. At the time of the reverse rotation of the left traveling motor 36L, the controller 60 sets, based on the control data L5, the fourth auxiliary coefficient η6d corresponding to the tendency of change in the rotational speeds of the traveling motors 36L and 36R and the amount of change in the rotational speeds of the traveling motors 36L and 36R. The correlation between the amount of change in the rotational speeds of the traveling motors 36L and 36R and the auxiliary coefficients η6a to η6d is not limited to the control data L5 as illustrated in FIG. 9.

Further, the controller 60 calculates, based on the rotational speed of the prime mover 32 detected by the second rotational speed detector 68c and the control data L1 illustrated in FIG. 4, the effective relief pressures u1 to u4 of the first to fourth relief valves 81a to 81d corresponding to the rotational speed of the prime mover 32 (S18 in FIG. 5B). Then, the controller 60 calculates a shift-down threshold ST for straight traveling, based on the effective relief pressures u1 to u4, the basic coefficients η5a to η5d, and the auxiliary coefficients η6a to η6d in accordance with Expression (4) below (S19).

$$ST(rpm) = \begin{pmatrix} u3(rpm) \times \eta 5a(rpm) \times \eta 6a(rpm) \\ u1(rpm) \times \eta 5b(rpm) \times \eta 6b(rpm) \\ u4(rpm) \times \eta 5c(rpm) \times \eta 6c(rpm) \\ u2(rpm) \times \eta 5d(rpm) \times \eta 6d(rpm) \end{pmatrix} \quad (4)$$

More specifically, the controller 60 multiplies the effective relief pressures u1 to u4 by the basic coefficients η5a to η5d and the auxiliary coefficients η6a to η6d to calculate the shift-down threshold ST for straight traveling. Since the basic coefficients η5a to η5d are values greater than 0 and less than 1, multiplying the effective relief pressures u1 to u4 by the basic coefficients η5a to η5d reduces the shift-down threshold ST. That is, the basic coefficients η5a to η5d are coefficients that make it easy to execute automatic shift-down for straight traveling. Since the auxiliary coefficients η6a to η6d are values greater than or equal to 1, multiplying the effective relief pressures u1 to u4 by the auxiliary coefficients η6a to η6d increases the shift-down threshold ST. That is, the auxiliary coefficients η6a to η6d are coefficients that make it difficult to execute automatic shift-down for straight traveling.

As described above, the controller 60 sets the auxiliary coefficients η6a to η6d to be greater than or equal to 1 such that the auxiliary coefficients η6a to η6d increase as the amount of change in the rotational speeds of the traveling motors 36L and 36R (the degree of change in the rotational speeds of the traveling motors 36L and 36R) increases when the rotational speeds of the traveling motors 36L and 36R tend to increase, thereby also setting the shift-down threshold ST to a large value to restrain automatic shift-down such that the automatic shift-down is difficult to activate. Further, the controller 60 sets the basic coefficients η5a to η5d to increase in the range of 0 to 1 as the rotational speed of the prime mover 32 increases, thereby also setting the shift-down threshold ST to a large value to restrain automatic shift-down such that the automatic shift-down is difficult to activate, with the degree of restraint being smaller than the degree of restraint using the auxiliary coefficients η6a to η6d described above.

Then, the controller 60 causes the first pressure detectors 80a to 80d to detect the first to fourth travel pressures LF, LB, RF, and RB (S20), and calculates the effective travel pressures a to d based on the first to fourth travel pressures LF, LB, RF, and RB (S21). At this time, the controller 60 calculates the effective travel pressures a to d based on the travel pressures LF, LB, RF, and RB in accordance with Expression (5) below.

$$\begin{pmatrix} a(t, rpm) \\ b(t, rpm) \\ c(t, rpm) \\ d(t, rpm) \end{pmatrix} = \begin{pmatrix} RF(t, rpm) - RB(t, rpm) \\ LF(t, rpm) - LB(t, rpm) \\ RB(t, rpm) - RF(t, rpm) \\ LB(t, rpm) - LF(t, rpm) \end{pmatrix} \quad (5)$$

More specifically, the controller 60 subtracts the second travel pressure LB from the first travel pressure LF to calculate a first effective travel pressure b. The controller 60 subtracts the first travel pressure LF from the second travel pressure LB to calculate a second effective travel pressure d. The controller 60 subtracts the fourth travel pressure RB from the third travel pressure RF to calculate a third effective travel pressure a. The controller 60 subtracts the third travel pressure RF from the fourth travel pressure RB to calculate a fourth effective travel pressure c.

The third effective travel pressure a indicates an effective travel pressure obtained at the time of the forward rotation of the right traveling motor 36R. The first effective travel pressure b indicates an effective travel pressure obtained at the time of the forward rotation of the left traveling motor 36L. The fourth effective travel pressure c indicates an effective travel pressure obtained at the time of the reverse rotation of the right traveling motor 36R. The second effective travel pressure d indicates an effective travel pressure obtained at the time of the reverse rotation of the left traveling motor 36L.

Then, as given in Expression (6) below, if at least one of the effective travel pressures a to d is greater than or equal to the shift-down threshold ST for straight traveling (S22: Yes in FIG. 5B), the automatic shift-down unit 61 of the controller 60 executes automatic shift-down to automatically shift down the speed stage for the rotational speeds of the traveling motors 36L and 36R from the second speed stage to the first speed stage (S23).

$$\begin{pmatrix} a(t, rpm) \\ b(t, rpm) \\ c(t, rpm) \\ d(t, rpm) \end{pmatrix} \geq ST(rpm) \quad (6)$$

After performing the automatic shift-down for straight traveling as described above, the controller 60 ends the automatic shift-down determination process. Then, the controller 60 re-starts the automatic shift-down determination process after some time.

In the automatic shift-down determination process according to the first preferred embodiment described above, when the rotational speeds of the traveling motors 36L and 36R are in the acceleration tendency, the controller 60 sets the auxiliary coefficients η6a to η6d to values greater than or equal to 1 (FIG. 9) to set the shift-down threshold to high (S19 in FIG. 5B and Expression (4)). As alternative to this, for example, as illustrated in FIG. 5C, the controller 60 may prohibit the automatic shift-down.

Figure 5C:
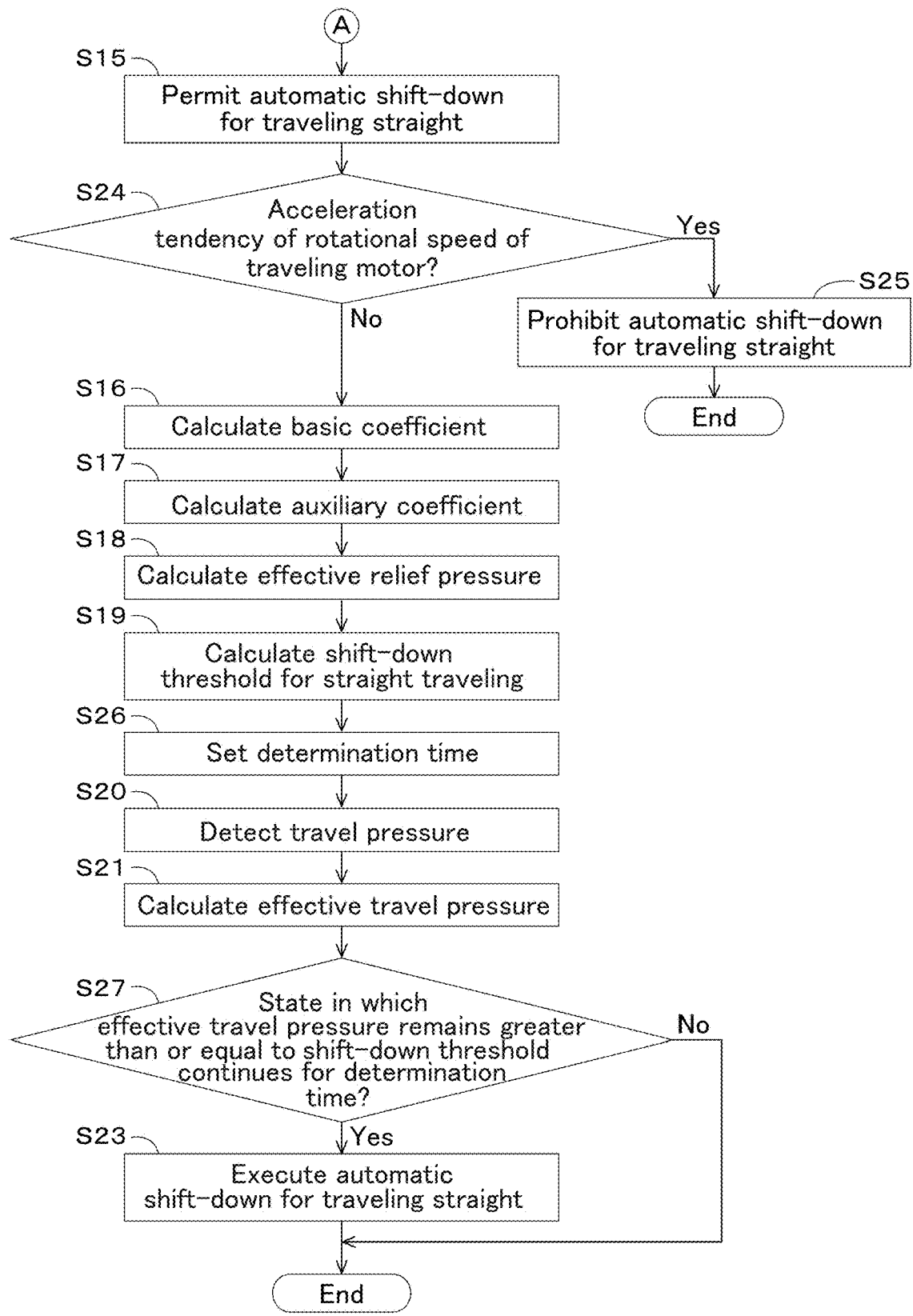
FIG. 5C is a flowchart illustrating part of an automatic shift-down determination process for straight traveling according to a second preferred embodiment.

FIG. 5C is a flowchart illustrating part of an automatic shift-down determination process for straight traveling according to a second preferred embodiment. The steps illustrated in FIG. 5C are executed by the controller 60 in place of the steps illustrated in FIG. 5B.

In the second preferred embodiment, after permitting the automatic shift-down (S15 in FIG. 5C), the controller 60 determines the tendency of change in the rotational speeds of the traveling motors 36L and 36R, based on the amount of change in the rotational speeds of the traveling motors 36L and 36R. If it is determined that the change in the rotational speeds of the traveling motors 36L and 36R is in the acceleration tendency (a tendency corresponding to an increase in the speed (acceleration) of the working machine 1 and the traveling devices 5L and 5R) (S24: YES), the controller 60 prohibits the automatic shift-down (S25), and then ends the automatic shift-down determination process.

In the first preferred embodiment illustrated in FIG. 5B, immediately after confirming that the effective travel pressures a to d are greater than or equal to the shift-down threshold ST (S22: Yes in FIG. 5B), the controller 60 causes the automatic shift-down unit 61 to execute the automatic shift-down (S23). As alternative to this, for example, as in the second preferred embodiment illustrated in FIG. 5C, the automatic shift-down may be executed in consideration of the period of time during which the effective travel pressures a to d remain greater than or equal to the shift-down threshold ST.

More specifically, after calculating the shift-down threshold ST for straight traveling (S19 in FIG. 5C), the controller 60 sets a determination time to determine whether to execute the automatic shift-down, based on the amount of change in the rotational speeds of the traveling motors 36L and 36R (S26).

At this time, for example, if the amount of change in the rotational speeds of the traveling motors 36L and 36R is a negative value and the absolute value of the amount of change is greater than a predetermined value, that is, if the rotational speeds of the traveling motors 36L and 36R rapidly decrease, the controller 60 sets a predetermined first time (fixed value) as the determination time. If the amount of change in the rotational speeds of the traveling motors 36L and 36R is a positive value and the absolute value of the amount of change is greater than the predetermined value, that is, if the rotational speeds of the traveling motors 36L and 36R rapidly increase (rapidly accelerate), the controller 60 sets a predetermined second time (fixed value) faster than the first time as the determination time. In other cases, the controller 60 sets a predetermined third time (fixed value, or a standard time) faster than the first time and shorter than the second time as the determination time.

After setting the determination time, the controller 60 detects the travel pressures LF, LB, RF, and RB (S20), and calculates the effective travel pressures a to d (S21). After that, in response to confirming that the effective travel pressures a to d are greater than or equal to the shift-down threshold ST for straight traveling, the controller 60 performs clocking using the internal memory. If the state in which at least one of the effective travel pressures a to d remains greater than or equal to the shift-down threshold ST continues for the determination time (S27: Yes), the controller 60 causes the automatic shift-down unit 61 to execute the automatic shift-down (S23).

In the preferred embodiments described above, the travel operation device 54 of a hydraulic type, which is capable of changing the pilot pressures acting on the traveling pumps 53L and 53R by using the operation valves 55A to 55D, is used. As alternative to this, for example, as illustrated in FIG. 10, a travel operation device 54A that is electrically activated may be used.

Figure 10:
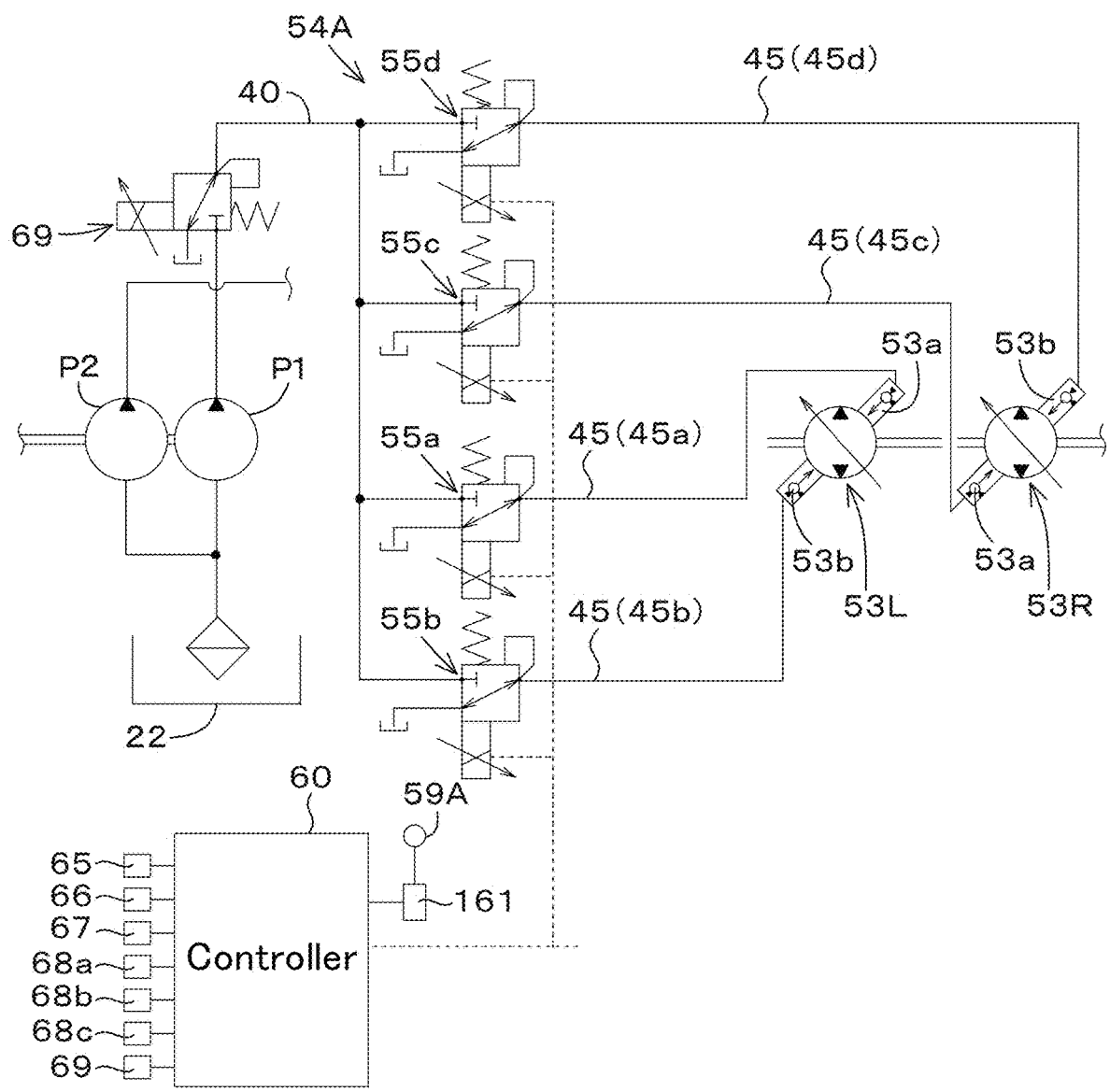
FIG. 10 is a diagram illustrating a hydraulic system for a working machine according to another preferred embodiment.

In the example illustrated in FIG. 10, the travel operation device 54A includes operation valves 55a, 55b, 55c, and 55d, each of which is a solenoid proportional valve. The controller 60 is connected to an operation detection sensor 161. The operation detection sensor 161 detects an amount and direction of operation of a travel operation member 59A. The travel operation member 59A is swingable in the left-right direction (machine-body width direction) or the front-rear direction. The controller 60 controls the activation of the operation valves 55a, 55b, 55c, and 55d, based on the amount and direction of operation of the travel operation member 59A, which are detected by the operation detection sensor 161.

When the travel operation member 59A is operated forward, the controller 60 outputs a control signal to the operation valve 55a and the operation valve 55c to tilt the swash plates of the left traveling pump 53L (hereinafter also referred to as the first traveling pump 53L) and the right traveling pump 53R (hereinafter also referred to as the second traveling pump 53R) in the direction for forward rotation (forward movement) of the traveling motors 36L and 36R. Accordingly, in response to the hydraulic fluid delivered from the traveling pumps 53L and 53R, the traveling motors 36L and 36R are driven to rotate forward, and the traveling devices 5L and 5R are also driven to rotate forward, which enables the working machine 1 to move straight forward.

When the travel operation member 59 is operated rearward, the controller 60 outputs a control signal to the operation valve 55b and the operation valve 55d to tilt the swash plates of the first traveling pump 53L and the second traveling pump 53R in the direction for reverse rotation (rearward movement) of the traveling motors 36L and 36R. Accordingly, in response to the hydraulic fluid delivered from the traveling pumps 53L and 53R, the traveling motors 36L and 36R are driven to rotate in reverse, and the traveling devices 5L and 5R are also driven to rotate in reverse, which enables the working machine 1 to move straight rearward.

When the travel operation member 59 is operated to the right, the controller 60 outputs a control signal to the operation valve 55a and the operation valve 55d to tilt the swash plate of the first traveling pump 53L in the direction for forward rotation of the traveling motor 36L and tilt the swash plate of the second traveling pump 53R in the direction for reverse rotation of the traveling motor 36R. Accordingly, in response to the hydraulic fluid delivered from the traveling pumps 53L and 53R, the left traveling motor 36L is driven to rotate forward, the right traveling motor 36R is driven to rotate in reverse, the left traveling device 5L is driven to rotate forward, and the right traveling device 5R is driven to rotate in reverse, which enables the working machine 1 to turn to the left.

When the travel operation member 59 is operated to the left, the controller 60 outputs a control signal to the operation valve 55b and the operation valve 55c to tilt the swash plate of the first traveling pump 53L in the direction for reverse rotation of the traveling motor 36L and tilt the swash plate of the second traveling pump 53R in the direction for forward rotation of the traveling motor 36R. Accordingly, in response to the hydraulic fluid delivered from the traveling pumps 53L and 53R, the left traveling motor 36L is driven to rotate in reverse, the right traveling motor 36R is driven to rotate forward, the left traveling device 5L is driven to rotate in reverse, and the right traveling device 5R is driven to rotate forward, which enables the working machine 1 to turn to the right.

Figure 11:
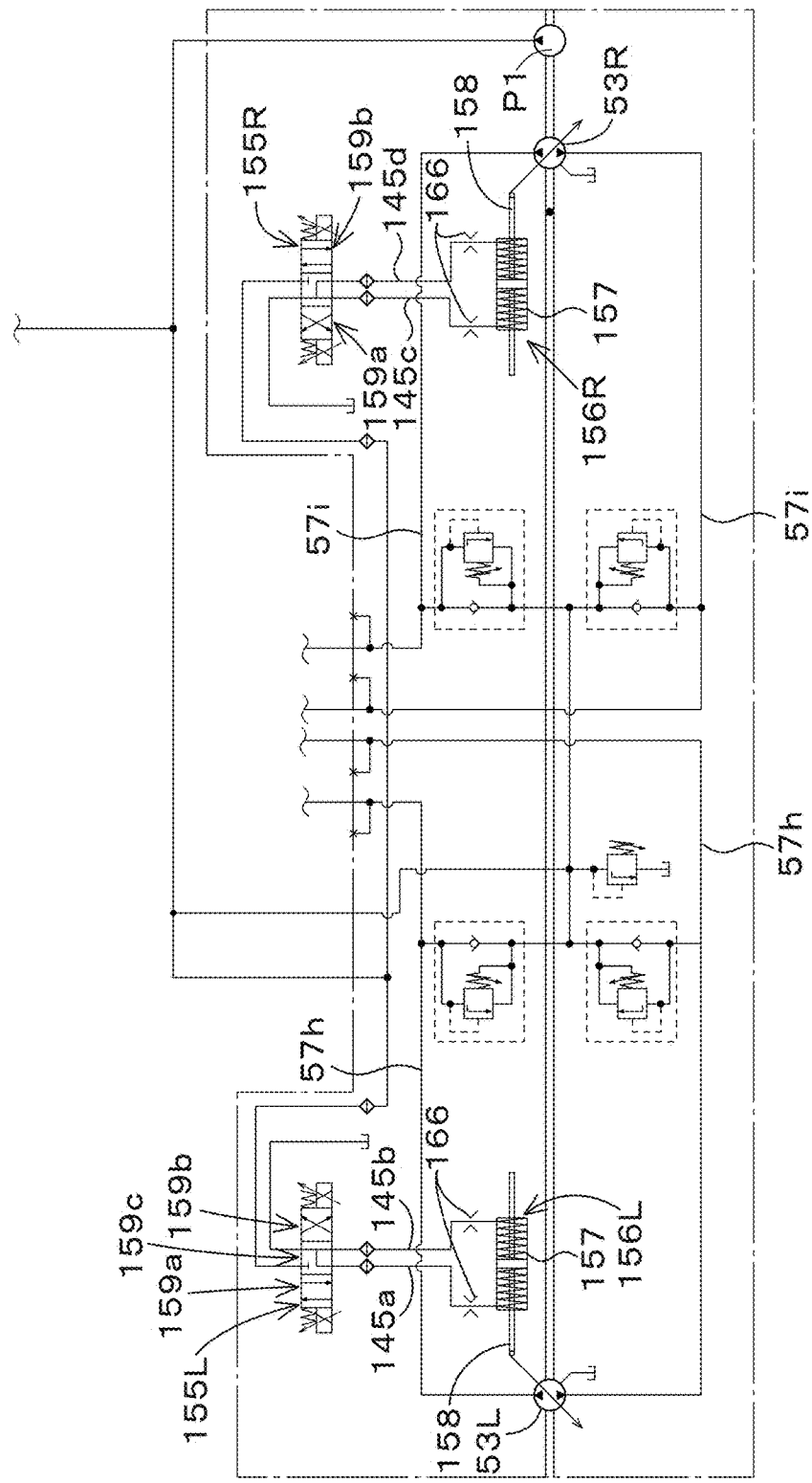
FIG. 11 is a diagram illustrating a hydraulic system for a working machine according to another preferred embodiment.

A portion of the hydraulic system 100 for the working machine 1 may be changed to a hydraulic circuit as illustrated in FIG. 11. In the hydraulic circuit illustrated in FIG. 11, the angles of the swash plates of the traveling pumps 53L and 53R are changed by operation valves 155L and 155R and hydraulic regulators 156L and 156R.

Each of the hydraulic regulators 156L and 156R includes a supply chamber 157 to which hydraulic fluid can be supplied, and a piston rod 158 disposed in the supply chamber 157. The piston rod 158 of the hydraulic regulator 156L is coupled to the swash plate of the first traveling pump 53L. The piston rod 158 of the hydraulic regulator 156R is coupled to the swash plate of the second traveling pump 53R. In response to the activation (linear movement) of the piston rods 158 of the hydraulic regulators 156L and 156R, the angles of the swash plates of the traveling pumps 53L and 53R are changed.

The operation valve 155L is a solenoid proportional valve configured to operate the hydraulic regulator 156L and is capable of switching among a first position 159a, a second position 159b, and a neutral position 159c. The position of the operation valve 155L is changed in response to movement of a spool of the operation valve 155L in accordance with a control signal output from the controller 60. The operation valve 155L has a first port connected to the supply chamber 157 of the hydraulic regulator 156L through a first travel fluid passage 145a. The operation valve 155L has a second port connected to the supply chamber 157 of the hydraulic regulator 156L through a second travel fluid passage 145b.

The operation valve 155R is a solenoid proportional valve configured to operate the hydraulic regulator 156R and is capable of switching among the first position 159a, the second position 159b, and the neutral position 159c. The position of the operation valve 155R is changed in response to movement of a spool of the operation valve 155R in accordance with a control signal output from the controller 60. The operation valve 155R has a first port connected to the supply chamber 157 of the hydraulic regulator 156R through a third travel fluid passage 145c. The operation valve 155R has a second port connected to the supply chamber 157 of the hydraulic regulator 156R through a fourth travel fluid passage 145d.

The controller 60 outputs a control signal to the operation valve 155L and the operation valve 155R to switch the operation valve 155L and the operation valve 155R to the first position 159a. Accordingly, the swash plates of the first traveling pump 53L and the second traveling pump 53R swing in the direction of forward rotation, which enables the first traveling pump 53L and the second traveling pump 53R to rotate forward.

The controller 60 outputs a control signal to the operation valve 155L and the operation valve 155R to switch the operation valve 155L and the operation valve 155R to the second position 159b. Accordingly, the swash plates of the first traveling pump 53L and the second traveling pump 53R swing in the direction of reverse rotation, which enables the first traveling pump 53L and the second traveling pump 53R to rotate in reverse.

The controller 60 outputs a control signal to the operation valve 155L and the operation valve 155R to switch the operation valve 155L to the first position 159a and switch the operation valve 155R to the second position 159b. Accordingly, the swash plate of the first traveling pump 53L swings in the direction of forward rotation, which enables the first traveling pump 53L to rotate forward, and the swash plate of the second traveling pump 53R swings in the direction of reverse rotation, which enables the second traveling pump 53R to rotate in reverse.

The controller 60 outputs a control signal to the operation valve 155L and the operation valve 155R to switch the operation valve 155L to the second position 159b and switch the operation valve 155R to the first position 159a. Accordingly, the swash plate of the first traveling pump 53L swings in the direction of reverse rotation, which enables the first traveling pump 53L to rotate in reverse, and the swash plate of the second traveling pump 53R swings in the direction of forward rotation, which enables the second traveling pump 53R to rotate forward.

Even with the use of electric actuators such as the solenoid proportional valves 55a to 55d or 155L and 155R described above, the angles of the swash plates of the traveling pumps 53L and 53R can be changed to change the rotation directions and rotational speeds of the traveling motors 36L and 36R.

The hydraulic system 100 for the working machine 1 and the working machine 1 according to the preferred embodiments described herein have the following configuration and achieve the following effects.

The hydraulic system 100 for the working machine 1 according to the preferred embodiments described herein includes the traveling motors 36L and 36R that output power to the traveling devices 5L and 5R disposed in the working machine 1; first detectors (first rotational speed detectors) 68a and 68b that detect a physical quantity (the rotational speed of the traveling motors 36L and 36R) that changes in accordance with a traveling state of the working machine 1, the physical quantity being detected at intervals of a predetermined period; and the controller 60 that executes automatic shift-down to automatically shift down the speed stage for the rotational speed of the traveling motors 36L and 36R from a second speed stage to a first speed stage in which the rotational speed of the traveling motors 36L and 36R is lower than that in the second speed stage. The controller 60 determines a tendency or degree of change in the physical quantity, based on a plurality of values of the physical quantity detected at intervals of the predetermined period by the first detectors 68a and 68b.

The working machine 1 according to the preferred embodiments described herein includes the traveling devices 5L and 5R that support the machine body 2 so as to allow the machine body 2 to travel; and the hydraulic system 100 for the working machine 1 described above.

The configuration described above enables the controller 60 to appropriately activate the automatic shift-down in accordance with the traveling state of the working machine 1 since the controller 60 can execute the automatic shift-down based on the tendency or degree of change in physical quantity that changes in accordance with the traveling state of the working machine 1.

In the preferred embodiments described herein, the controller 60 calculates an amount of temporal change of the plurality of values of the physical quantity, makes a determination of the tendency or degree of change in the physical quantity based on the calculated amount of temporal change, and executes the automatic shift-down in accordance with a result of the determination. With this configuration, even in response to an instantaneous fluctuation of the physical quantity when the working machine 1 starts from a stop position, increases its speed from a low-speed traveling state, or comes into contact with a step, the controller 60 can easily and appropriately determine, while being less affected by the fluctuation, the tendency or degree of change in physical quantity that changes in accordance with the traveling state of the working machine 1. Therefore, it is possible to more appropriately activate the automatic shift-down in accordance with the traveling state of the working machine 1.

In the preferred embodiments described herein, the controller 60 holds a predetermined number of values of the physical quantity, the predetermined number being two or more. In response to detection of a new value of the physical quantity by the first detectors 68a and 68b, the controller 60 holds the new value of the physical quantity in place of an oldest value among the held values of the physical quantity, calculates an average of the held values of the physical quantity, and holds a predetermined number of the averages, the predetermined number being two or more. The controller 60 calculates a difference between a latest average and an oldest average among the held averages as an amount of temporal change in the physical quantity.

With this configuration, even in response to an instantaneous fluctuation of the physical quantity when the working machine 1 starts from a stop position, increases its speed from a low-speed traveling state, or comes into contact with a step, the controller 60 can more appropriately determine the tendency or degree of change in the physical quantity without being affected by the fluctuation. In addition, even if noise is included in the detection values of the physical quantity detected by the first detectors 68a and 68b or in response to an instantaneous fluctuation of the detection values of the physical quantity in accordance with such an irregular traveling state of the working machine 1 as described above, the controller 60 can appropriately determine the tendency or degree of change in the physical quantity. Therefore, it is possible to more appropriately activate the automatic shift-down in accordance with the traveling state of the working machine 1.

In the preferred embodiments described herein, in response to a determination being made that the change in the physical quantity has a tendency corresponding to an increase in a travel speed of the working machine 1, the controller 60 restrains the automatic shift-down such that the automatic shift-down becomes difficult to activate as the degree of change in the physical quantity increases. This configuration can prevent unintentional activation of the automatic shift-down if an increase in the speed (acceleration) of the working machine 1 is required.

In the preferred embodiments described herein, the controller 60 sets, based on the tendency or degree of change in the physical quantity, the shift-down threshold ST for determining whether to execute the automatic shift-down. This configuration enables the controller 60 to set the shift-down threshold corresponding to the traveling state of the working machine 1, and it is possible to more appropriately activate the automatic shift-down in accordance with the traveling state of the working machine 1.

The hydraulic system 100 for the working machine 1 according to the preferred embodiments described herein further includes the traveling pumps 53L and 53R configured to supply hydraulic fluid to the traveling motors 36L and 36R to drive the traveling motors 36L and 36R; the circulation fluid passages 57h and 57i connected to the traveling pumps 53L and 53R and the traveling motors 36L and 36R; the relief valves 81a to 81d connected to the circulation fluid passages 57h and 57i; the prime mover 32 serving as a power source of the traveling pumps 53L and 53R; and the second detector (second rotational speed detector) 68c configured to detect a rotational speed of the prime mover 32. The controller 60 sets the shift-down threshold ST, based on the tendency or degree of change in the physical quantity, an effective relief pressure of the relief valves 81a to 81d corresponding to a rotational speed of the prime mover 32 detected by the second detector 68c, first coefficients (basic coefficients) η5a to η5d corresponding to the rotational speed of the prime mover 32 detected by the second detector 68c, and second coefficients (auxiliary coefficients) η6a to η6d corresponding to an amount of temporal change in the physical quantity calculated from the plurality of values of the physical quantity.

This configuration enables the controller 60 to appropriately set the shift-down threshold ST corresponding to the traveling state of the working machine 1, and it is possible to more appropriately activate the automatic shift-down in accordance with the traveling state of the working machine 1. Specifically, when the physical quantity has a tendency corresponding to shift-down of the travel speed of the working machine 1, the controller 60 can set the shift-down threshold ST to a small value to facilitate activation of the automatic shift-down. When the physical quantity has a tendency corresponding to an increase in the travel speed of the working machine 1, the controller 60 can set the shift-down threshold ST to a large value to restrain the automatic shift-down such that the automatic shift-down is difficult to activate.

In the preferred embodiments described herein, the controller 60 sets a value greater than 0 and less than 1 as the first coefficients η5a to η5d, sets a value greater than or equal to 1 as the second coefficients η6a to η6d, sets a value greater than 1 as the second coefficients η6a to η6d when the change in the physical quantity has a tendency corresponding to an increase in a travel speed of the working machine 1, and multiplies the effective relief pressures u1 to u4, the first coefficients η5a to η5d, and the second coefficients η6a to η6d to set the shift-down threshold ST. With this configuration, the controller 60 changes the first coefficients η5a to η5d to adjust the extent of reduction in the shift-down threshold ST, and can easily control the ease of activation of the automatic shift-down. Further, the controller 60 changes the second coefficients η6a to η6d to adjust the extent of increase in the shift-down threshold ST, and can easily control the difficulty of activation of the automatic shift-down. In particular, it is possible to prevent the automatic shift-down from being unnecessarily activated while the travel speed of the working machine 1 is increasing (accelerating).

The hydraulic system 100 for the working machine 1 according to the preferred embodiments described herein further includes third detectors (pressure detectors) 80a to 80d configured to detect the travel pressures LF, LB, RF, and RB, which are pressures of the hydraulic fluid acting on the circulation fluid passages 57h and 57i during a rotation of the traveling motors 36L and 36R. The controller 60 executes the automatic shift-down, based on the travel pressures LF, LB, RF, and RB detected by the third detectors 80a to 80d and the shift-down threshold ST, when the rotational speed of the traveling motors 36L and 36R is in the second speed stage. This configuration enables the controller 60 to appropriately activate the automatic shift-down, based on the travel pressures LF, LB, RF, and RB, which change in accordance with the traveling state of the working machine 1, and the shift-down threshold ST.

In the preferred embodiments described herein, the controller 60 executes the automatic shift-down, based on the travel pressures LF, LB, RF, and RB and the shift-down threshold ST, when the working machine 1 is traveling straight and the rotational speed of the traveling motors 36L and 36R is in the second speed stage. This configuration enables the controller 60 to appropriately activate, during straight traveling of the working machine 1, the automatic shift-down, based on the travel pressures LF, LB, RF, and RB, which change in accordance with the traveling state of the working machine 1, and the shift-down threshold ST.

In the preferred embodiments described herein, the hydraulic system 100 for the working machine 1 further includes the travel operation member 59 (59A) configured to operate driving of the traveling pumps 53L and 53R. The controller 60 determines that the working machine 1 is traveling straight, based on the operating state of the travel operation member 59 (59A). With this configuration, while the driver operates the travel operation member 59 (59A) to cause the working machine 1 to travel straight, the automatic shift-down can be activated to allow the working machine 1 to travel efficiently.

In the preferred embodiments described herein, the controller 60 executes the automatic shift-down in response to the effective travel pressures a, b, c, and d calculated based on the travel pressures LF, LB, RF, and RB being greater than or equal to the shift-down threshold ST. This configuration enables the controller 60 to compare the effective travel pressures a, b, c, and d with the shift-down threshold ST corresponding to the traveling state of the working machine 1 and to appropriately activate the automatic shift-down in accordance with the traveling state of the working machine 1.

In the preferred embodiments described herein, the controller 60 executes the automatic shift-down in response to a high-effective-travel-pressure state continuing for a pre-determined determination time, the high-effective-travel-pressure state being a state in which the effective travel pressures a, b, c, and d remain greater than or equal to the shift-down threshold ST, and sets the determination time, based on an amount of change in the physical quantity calculated from the plurality of values of the physical quantity. This configuration can prevent the automatic shift-down from being unnecessarily activated even in response to an instantaneous fluctuation of the physical quantity when the working machine 1 starts from a stop position, increases its speed from a low-speed traveling state, or comes into contact with a step.

In the preferred embodiments described herein, the controller 60 prohibits the automatic shift-down in response to a determination being made that the change in the physical quantity has a tendency corresponding to an increase in the travel speed of the working machine 1. This configuration can prevent the automatic shift-down from being unnecessarily activated while the travel speed of the working machine 1 is increased (accelerated).

In the preferred embodiments described herein, the controller 60 determines the degree of change in the physical quantity, based on an average of the plurality of values of the physical quantity and the rotational speed of the prime mover 32 detected by the second detector 68c. This configuration enables the controller 60 to determine the degree of change in the physical quantity even in response to a fluctuation of the physical quantity in accordance with a change in the rotational speed of the prime mover 32, and to appropriately activate the automatic shift-down.

In the preferred embodiments described herein, the controller 60 determines that the degree of change in the physical quantity is large in response to the average of the plurality of values of the physical quantity being greater than a determination reference value corresponding to the rotational speed of the prime mover 32, and prohibits the automatic shift-down. This configuration can prevent the automatic shift-down from being unnecessarily activated when the change in the physical quantity is large due to factors such as an increase in the travel speed (acceleration) of the working machine 1.

In the preferred embodiments described herein, the hydraulic system 100 for the working machine 1 further includes the travel operation member 59 (59A) configured to operate driving of the traveling pumps 53L and 53R. The controller 60 the controller 60 prohibits the automatic shift-down in response to detection of operation of the travel operation member 59 (59A) in a direction opposite to a direction in which the working machine 1 is traveling. This configuration can prevent the automatic shift-down from being unnecessarily activated even in response to a temporary fluctuation of the physical quantity in accordance with operation of the travel operation member 59 (59A) in a direction opposite to the direction in which the working machine 1 is traveling (i.e., reverse operation of the travel operation member 59 (59A)).

In the preferred embodiments described herein, the controller 60 sets a standby time, based on the plurality of values of the physical quantity, in response to detection of operation of the travel operation member 59 (59A) in a direction (forward or rearward) corresponding to straight traveling of the working machine 1, and makes a determination of the tendency and degree of change in the physical quantity in response to an elapse of the standby time. This configuration can prevent the automatic shift-down from being unnecessarily activated even in response to a temporary fluctuation of the physical quantity immediately after the travel operation member 59 (59A) is operated. In particular, the controller 60 calculates an amount of temporal change in the physical quantity from the stored plurality of values of the physical quantity, and sets the standby time based on the amount of temporal change, which makes it possible to further prevent the automatic shift-down from being unnecessarily activated immediately after the operation of the travel operation member 59 (59A).

In the preferred embodiments described herein, the first detectors 68a and 68b detect the rotational speeds of the traveling motors 36L and 36R as the physical quantity at intervals of the predetermined period. The controller 60 determines a tendency or degree of change in the rotational speed, based on a plurality of values of the rotational speeds of the traveling motors 36L and 36R detected at intervals of the predetermined period by the first detectors 68a and 68b. This configuration enables the controller 60 to appropriately determine a tendency or degree of change in the rotational speeds of the traveling motors 36L and 36R, which change in accordance with the traveling state of the working machine 1, based on time-series data of the rotational speeds of the traveling motors 36L and 36R. The controller 60 can execute the automatic shift-down, based on the tendency or degree of change in the rotational speeds of the traveling motors 36L and 36R. As a result, it is possible to appropriately activate the automatic shift-down in accordance with the traveling state of the working machine 1.

In the preferred embodiments described above, two speed stages, namely, the first speed stage and the second speed stage, are presented as speed stages between which the rotational speeds of the traveling motors 36L and 36R are switched. However, the number of speed stages for the rotational speeds of the traveling motors 36L and 36R is not limited to two, and may be three or more. In this case, a speed stage for the rotational speeds of the traveling motors 36L and 36R is referred to as a first speed stage, and a speed stage obtained by shift-up from the first speed stage and higher than the first speed stage is referred to as a second speed stage.

In the preferred embodiments described above, the traveling pumps 53L and 53R are axial pumps. As a non-limiting example, a radial piston pump or any other pump may be used as each of the traveling pumps 53L and 53R. Alternatively, an axial piston motor, a radial piston motor, or the like may be used as each of the traveling motors 36L and 36R.

In the preferred embodiments described above, the controller 60 calculates the shift-down threshold ST, based on the effective relief pressures u1 to u4, the basic coefficients $\eta 5a$ to $\eta 5d$, and the auxiliary coefficients $\eta 6a$ to $\eta 6d$, for example, but this is not a limitation. The shift-down threshold ST may be calculated using, instead of the effective relief pressures u1 to u4, any other physical quantity, for example, the rotational speed of the prime mover 32, the pilot pressure (or opening) acting on the anti-stall proportional valve 90, the angles of the swash plates of the traveling pumps 53L and 53R, the pilot pressure acting on the travel fluid passages 45a to 45d or 145a to 145d, or the travel load (the discharge flow rate of the hydraulic fluid from the relief valves 81a to 81d).

In the preferred embodiments described above, the controller 60 sets the auxiliary coefficients $\eta 6a$ to $\eta 6d$ to increase as the amount of change in the rotational speeds of the traveling motors 36L and 36R (the degree of change in the rotational speeds of the traveling motors 36L and 36R) increases when the rotational speeds of the traveling motors 36L and 36R tend to increase, thereby also setting the shift-down threshold ST to a large value to restrain automatic shift-down such that the automatic shift-down is difficult to activate, for example, but this is not limitation. Alternatively, for example, the controller 60 may correct the effective relief pressures u1 to u4 so that the effective relief pressures u1 to u4 increase as the degree of acceleration tendency of the rotational speeds of the traveling motors 36L and 36R (the magnitude of the amount of change in the rotational speeds of the traveling motors 36L and 36R when the amount of change is a positive value) increases, thereby setting the shift-down threshold ST to a large value to restrain automatic shift-down such that the automatic shift-down is difficult to activate. Alternatively, the controller 60 may correct the effective travel pressures a to d so that the effective travel pressures a to d decrease as the degree of acceleration tendency of the rotational speeds of the traveling motors 36L and 36R increases, thereby making it difficult for the effective travel pressures a to d to become greater than or equal to the shift-down threshold ST to restrain automatic shift-down such that the automatic shift-down is difficult to activate.

In the preferred embodiments described above, the controller 60 executes the automatic shift-down when the effective travel pressures a, b, c, and d calculated based on the travel pressures LF, LB, RF, and RB are greater than or equal to the shift-down threshold ST, for example, but this is not limitation. Alternatively, for example, the controller 60 may compare the travel pressures LF, LB, RF, and RB with the corresponding shift-down thresholds and execute the automatic shift-down when any of the travel pressures LF, LB, RF, and RB is greater than or equal to the corresponding shift-down threshold. Alternatively, the controller 60 may execute the automatic shift-down, based on a result of comparison between a calculation value calculated based on the travel pressures LF, LB, RF, and RB and a shift-down threshold.

In the preferred embodiments described above, the rotational speed detectors 68a and 68b detect the rotational speeds and rotation directions of the traveling motors 36L and 36R. As alternative to this, for example, sensors or the like may be used to detect the angles of the swash plates of the traveling pumps 53L and 53R, and the rotational speeds and rotation directions of the traveling motors 36L and 36R may be detected based on the detected angles of the swash plates.

In the preferred embodiments described above, the controller 60 makes a determination of the tendency and degree of change in the rotational speeds of the traveling motors 36L and 36R, based on the time-series data of the rotational speeds of the traveling motors 36L and 36R, and executes or prohibits the automatic shift-down or sets a shift-down threshold and a return threshold in accordance with a result of the determination, for example, but this is not limitation. As alternative to this, any other physical quantity may be used, such as the rotational speed of the prime mover 32, the pilot pressure acting on the anti-stall proportional valve 90 or the travel fluid passages 45a to 45d or 145a to 145d, the travel load, the angles of the swash plates of the traveling pumps 53L and 53R, the travel speeds of the traveling devices 5L and 5R, or the position or travel speed of the working machine 1.

That is, the controller 60 may make a determination of, based on the time-series data of a physical quantity that changes in accordance with the traveling state (travel speed) of the working machine 1 as described above, the tendency and degree of change in the physical quantity, and may execute or prohibit the automatic shift-down or set a shift-down threshold in accordance with a result of the determination. The physical quantities described above are detectable using a rotational speed detector, a pressure detector, an angle sensor, a flow rate detector, a speed sensor, an acceleration sensor, a GPS sensor, or the like.

Further, not only when the working machine 1 is traveling straight, but also when the working machine 1 is traveling while slightly turning or when the working machine 1 is turning, the controller 60 may make a determination of the tendency and degree of change in the physical quantity described above, and execute or prohibit the automatic shift-down or set a shift-down threshold in accordance with a result of the determination.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system for a working machine, the hydraulic system comprising:
   a traveling motor to output power to a traveling device in the working machine;
   a first detector to detect a physical quantity that changes in accordance with a traveling state of the working machine and that is detected at intervals of a predetermined period; and
   a controller to execute automatic shift-down to automatically shift down a speed stage for a rotational speed of the traveling motor from a second speed stage to a first speed stage in which the rotational speed of the traveling motor is lower than the rotational speed of the traveling motor in the second speed stage; wherein
   the controller is configured or programmed to determine a tendency or degree of change in the physical quantity, based on a plurality of values of the physical quantity detected at intervals of the predetermined period by the first detector.

2. The hydraulic system for a working machine according to claim 1, wherein the controller is configured or programmed to calculate an amount of temporal change in the physical quantity based on the detected plurality of values of the physical quantity, make a determination of the tendency or degree of change in the physical quantity based on the calculated amount of temporal change, and execute the automatic shift-down in accordance with a result of the determination.

3. The hydraulic system for a working machine according to claim 2, wherein
   the controller is configured or programmed to:
      hold two or more of the detected values of the physical quantity;
      in response to detection of a new value of the physical quantity by the first detector, hold the new value of the physical quantity in place of an oldest value among the held values of the physical quantity, calculate an average of the held values of the physical quantity, and hold two or more of the averages; and
      calculate a difference between a latest average and an oldest average among the held averages as the amount of temporal change in the physical quantity.

4. The hydraulic system for a working machine according to claim 1, wherein the controller is configured or programmed to, in response to a determination being made that the change in the physical quantity has a tendency corresponding to an increase in a travel speed of the working machine, restrain the automatic shift-down such that the automatic shift-down becomes difficult to activate as the degree of change in the physical quantity increases.

5. The hydraulic system for a working machine according to claim 1, wherein the controller is configured or programmed to set a shift-down threshold, based on the tendency or degree of change in the physical quantity, the shift-down threshold being a threshold for determining whether to execute the automatic shift-down.

6. The hydraulic system for a working machine according to claim 5, further comprising:
   a traveling pump to supply hydraulic fluid to the traveling motor to drive the traveling motor;
   a circulation fluid passage connected to the traveling pump and the traveling motor;
   a relief valve connected to the circulation fluid passage;
   a prime mover defining a power source of the traveling pump; and
   a second detector to detect a rotational speed of the prime mover; wherein
   the controller is configured or programmed to set the shift-down threshold, based on the tendency or degree of change in the physical quantity, an effective relief pressure of the relief valve corresponding to the rotational speed of the prime mover detected by the second detector, a first coefficient corresponding to the rotational speed of the prime mover detected by the second detector, and a second coefficient corresponding to an amount of temporal change in the physical quantity calculated from the plurality of values of the physical quantity.

7. The hydraulic system for a working machine according to claim 6, wherein
   the controller is configured or programmed to:
      set a value greater than 0 and less than 1 as the first coefficient;
      set a value greater than or equal to 1 as the second coefficient;
      set a value greater than 1 as the second coefficient when the change in the physical quantity has a tendency corresponding to an increase in a travel speed of the working machine; and
      multiply the effective relief pressure, the first coefficient, and the second coefficient to set the shift-down threshold.

8. The hydraulic system for a working machine according to claim 5, further comprising:
   a traveling pump to supply hydraulic fluid to the traveling motor to drive the traveling motor;
   a circulation fluid passage connected to the traveling pump and the traveling motor; and
   a third detector to detect a travel pressure, the travel pressure being a pressure of the hydraulic fluid acting on the circulation fluid passage during a rotation of the traveling motor; wherein
   the controller is configured or programmed to execute the automatic shift-down, based on the travel pressure detected by the third detector and the shift-down threshold, when the rotational speed of the traveling motor is in the second speed stage.

9. The hydraulic system for a working machine according to claim 8, wherein the controller is configured or programmed to execute the automatic shift-down, based on the travel pressure and the shift-down threshold, when the working machine is traveling straight and the rotational speed of the traveling motor is in the second speed stage.

10. The hydraulic system for a working machine according to claim 9, further comprising:
    a travel operation member to operate driving of the traveling pump; wherein
    the controller is configured or programmed to determine that the working machine is traveling straight, based on an operating state of the travel operation member.

11. The hydraulic system for a working machine according to claim 8, wherein the controller is configured or programmed to execute the automatic shift-down in response to an effective travel pressure calculated based on the travel pressure being greater than or equal to the shift-down threshold.

12. The hydraulic system for a working machine according to claim 11, wherein
    the controller is configured or programmed to:
       execute the automatic shift-down in response to a high-effective-travel-pressure state continuing for a predetermined determination time, the high-effective-travel-pressure state being a state in which the effective travel pressure remains greater than or equal to the shift-down threshold; and
set the determination time, based on an amount of change in the physical quantity calculated from the plurality of values of the physical quantity.

13. The hydraulic system for a working machine according to claim 1, wherein the controller is configured or programmed to prohibit the automatic shift-down in response to a determination being made that the change in the physical quantity has a tendency corresponding to an increase in a travel speed of the working machine.

14. The hydraulic system for a working machine according to claim 1, further comprising:
a traveling pump to supply hydraulic fluid to the traveling motor to drive the traveling motor;
a prime mover defining a power source of the traveling pump; and
a second detector to detect a rotational speed of the prime mover; wherein
the controller is configured or programmed to determine the degree of change in the physical quantity, based on an average of the plurality of values of the physical quantity and the rotational speed of the prime mover detected by the second detector.

15. The hydraulic system for a working machine according to claim 14, wherein the controller is configured or programmed to determine that the degree of change in the physical quantity is large in response to the average of the plurality of values of the physical quantity being greater than a determination reference value corresponding to the rotational speed of the prime mover, and prohibit the automatic shift-down.

16. The hydraulic system for a working machine according to claim 1, further comprising:
a traveling pump to supply hydraulic fluid to the traveling motor to drive the traveling motor; and
a travel operation member to operate driving of the traveling pump; wherein
the controller is configured or programmed to prohibit the automatic shift-down in response to detection of operation of the travel operation member in a direction corresponding to a direction opposite to a direction in which the working machine is traveling.

17. The hydraulic system for a working machine according to claim 1, further comprising:
a traveling pump to supply hydraulic fluid to the traveling motor to drive the traveling motor; and
a travel operation member to operate driving of the traveling pump; wherein
the controller is configured or programmed to set a standby time, based on the plurality of values of the physical quantity, in response to detection of operation of the travel operation member in a direction corresponding to straight traveling of the working machine, and make a determination of the tendency and degree of change in the physical quantity in response to an elapse of the standby time.

18. The hydraulic system for a working machine according to claim 1, wherein
the first detector is operable to detect the rotational speed of the traveling motor as the physical quantity at intervals of the predetermined period; and
the controller is configured or programmed to determine a tendency or degree of change in the rotational speed, based on a plurality of values of the rotational speed of the traveling motor detected at intervals of the predetermined period by the first detector.

19. A working machine, comprising:
a traveling device to support a machine body of the working machine so as to allow the machine body to travel; and
the hydraulic system for a working machine according to claim 1.

* * * * *